(12) United States Patent
Campbell et al.

(10) Patent No.: US 8,791,804 B2
(45) Date of Patent: Jul. 29, 2014

(54) BI-DIRECTIONAL PORTABLE ELECTRONIC DEVICE FOR INTERACTION WITH VEHICLE SYSTEMS

(75) Inventors: Douglas C. Campbell, Northville, MI (US); Thierry Pinard, Garches (FR); Christophe Gueble, Paris (FR); Elie Abichaaya, Jouy le Moutier (FR); Volker Dreisbach, Cologne (DE); Didier Pozzi, Ermont (FR); Pascal Laignel, Boulogne Billancourt (FR); Karmaidine Mougamadou, Cergy (FR)

(73) Assignee: Johnson Controls Technology Company, Holland, MI (US)

( * ) Notice: Subject to any disclaimer, the term of this patent is extended or adjusted under 35 U.S.C. 154(b) by 15 days.

(21) Appl. No.: 13/328,548

(22) Filed: Dec. 16, 2011
(Under 37 CFR 1.47)

(65) Prior Publication Data

US 2012/0313768 A1 Dec. 13, 2012

Related U.S. Application Data

(63) Continuation of application No. 12/811,993, filed as application No. PCT/US2008/088468 on Dec. 29, 2008, now abandoned.

(60) Provisional application No. 61/020,077, filed on Jan. 9, 2008.

(51) Int. Cl.
*B60Q 1/00* (2006.01)

(52) U.S. Cl.
USPC .................. 340/438; 340/539.1; 340/539.11; 340/539.13

(58) Field of Classification Search
USPC .................... 340/438, 539.1, 539.11, 539.13
See application file for complete search history.

(56) References Cited

U.S. PATENT DOCUMENTS

| | | | |
|---|---|---|---|
| 2002/0164962 A1* | 11/2002 | Mankins et al. | ................. 455/99 |
| 2004/0222899 A1 | 11/2004 | Yezersky et al. | |
| 2005/0134454 A1* | 6/2005 | Eskildsen | ................ 340/539.14 |
| 2006/0077037 A1 | 4/2006 | Luo et al. | |
| 2006/0149431 A1 | 7/2006 | Wilson et al. | |
| 2006/0202808 A1* | 9/2006 | Obradovich | ................ 340/425.5 |
| 2006/0220834 A1* | 10/2006 | Maeng | ......................... 340/539.1 |
| 2007/0288131 A1* | 12/2007 | Yakes et al. | ..................... 701/22 |

FOREIGN PATENT DOCUMENTS

| | | |
|---|---|---|
| DE | 101 12 027 A1 | 9/2002 |
| JP | 06-028137 | 4/1994 |
| JP | 07-324532 A | 12/1995 |
| JP | 10-231651 | 9/1998 |
| JP | 2000-054940 A | 2/2000 |
| JP | 2004-312621 A | 11/2004 |

OTHER PUBLICATIONS

International Search Report corresponding to PCT/US2008/088468, dated Sep. 22, 2009, 3 pages.

(Continued)

*Primary Examiner* — Daryl Pope
(74) *Attorney, Agent, or Firm* — Foley & Lardner LLP

(57) ABSTRACT

A portable electronic device for displaying information from a vehicle having a first transceiver to a user carrying the portable electronic device includes a second transceiver. The portable electronic device uses the second transceiver to conduct bi-directional communications with the vehicle systems. The portable electronic device may be a key-fob and include a display for displaying the information from the vehicle.

8 Claims, 17 Drawing Sheets

(56) References Cited

OTHER PUBLICATIONS

PCT Written Opinion corresponding to PCT/US2008/088468, dated Sep. 22, 2009, 5 pages.
Office Action in JP Appln No. 2010-542251 dated Jun. 11, 2013. (Translation).
Japanese Office Action received in connection with Japanese application No. 2010-0542251 (with English translation); dtd Dec. 19, 2012.
English Translation of Japanese Office Action received in connection with Japanese application No. 2010-0542251; dtd Dec. 19, 2012.
Chinese Office Action and English translation received in connection with related case CN 200880127750.8 Dtd Oct. 10, 2012.

\* cited by examiner

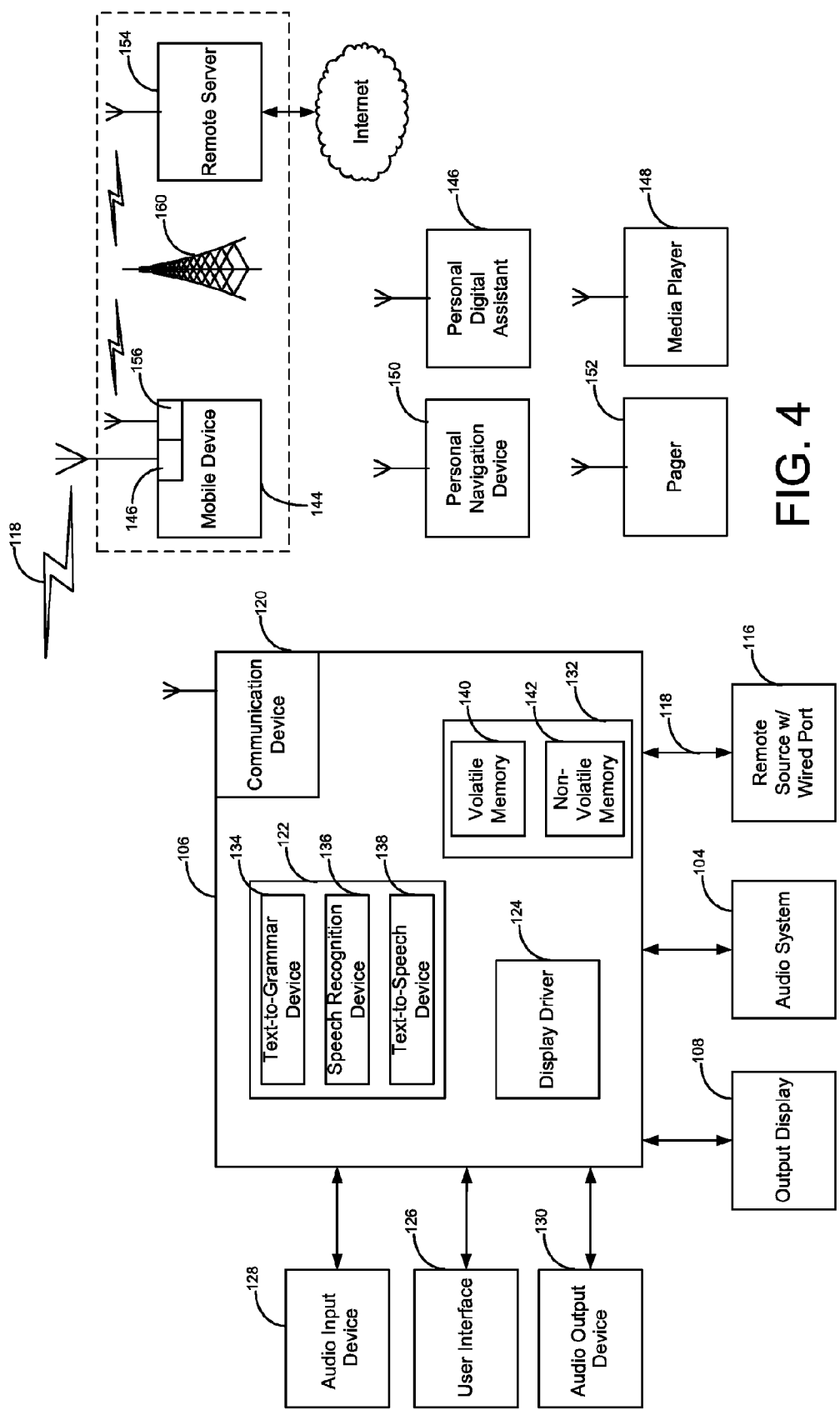

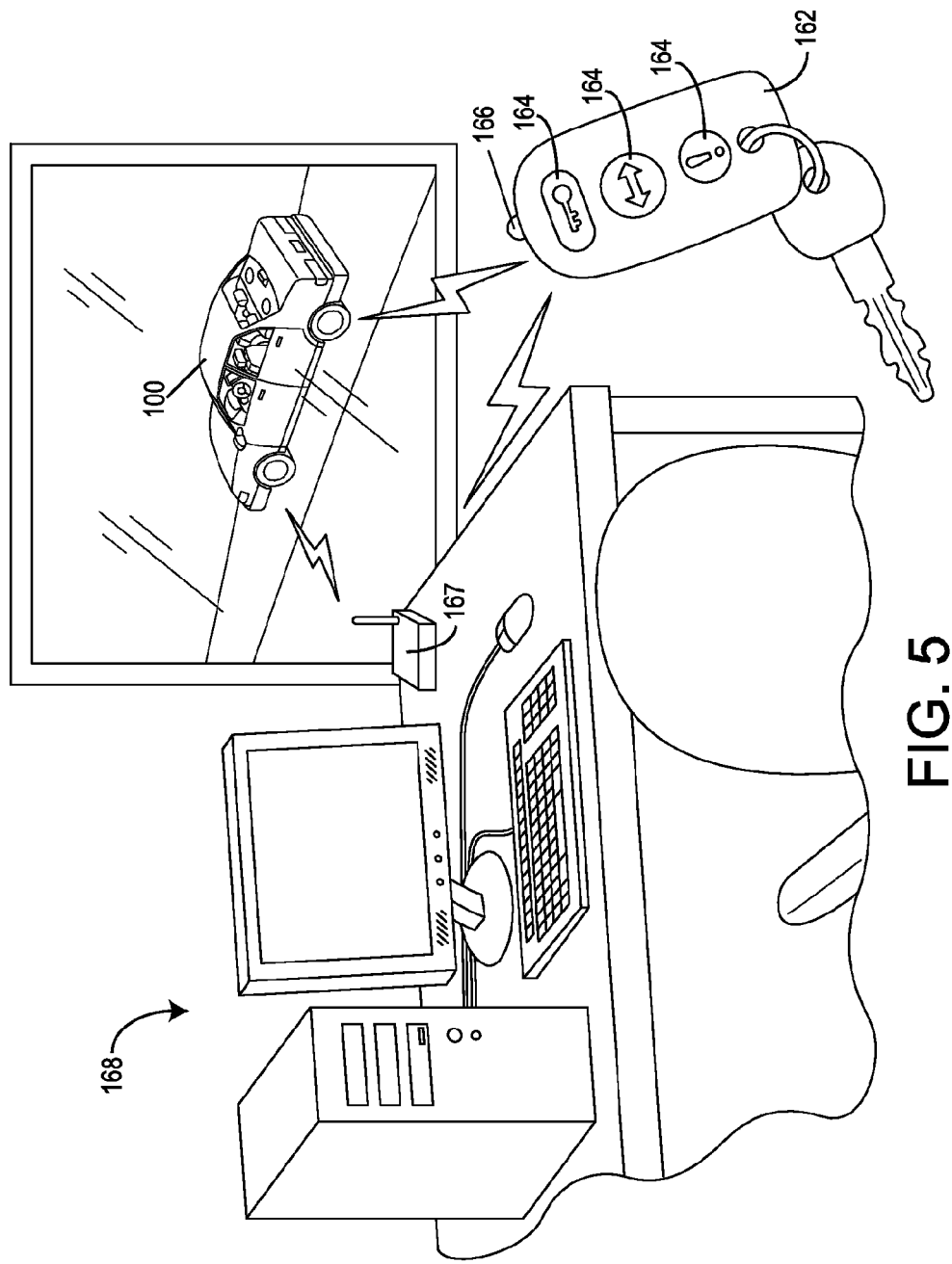

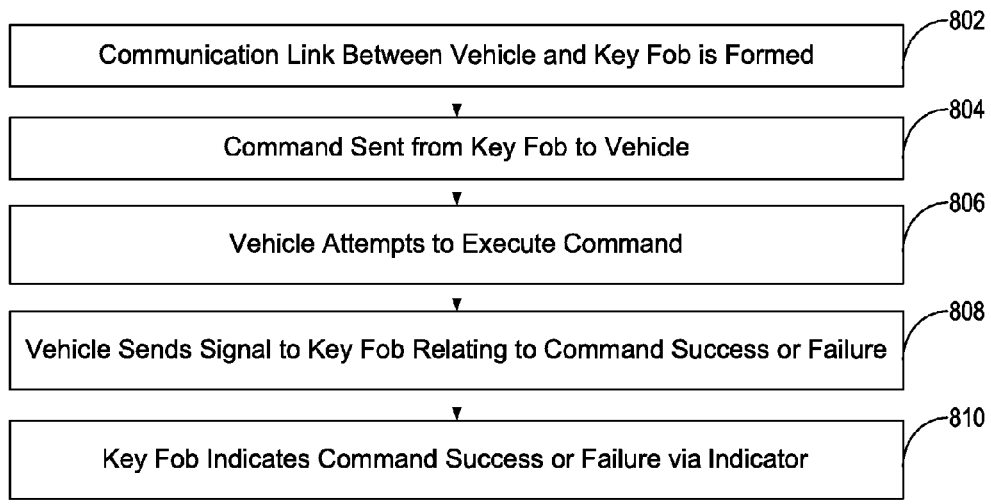
FIG. 8A
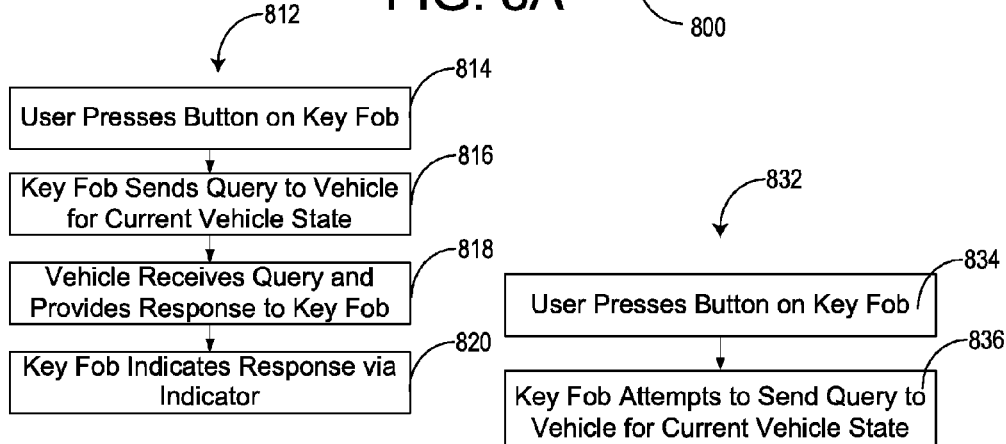
FIG. 8B
FIG. 8D
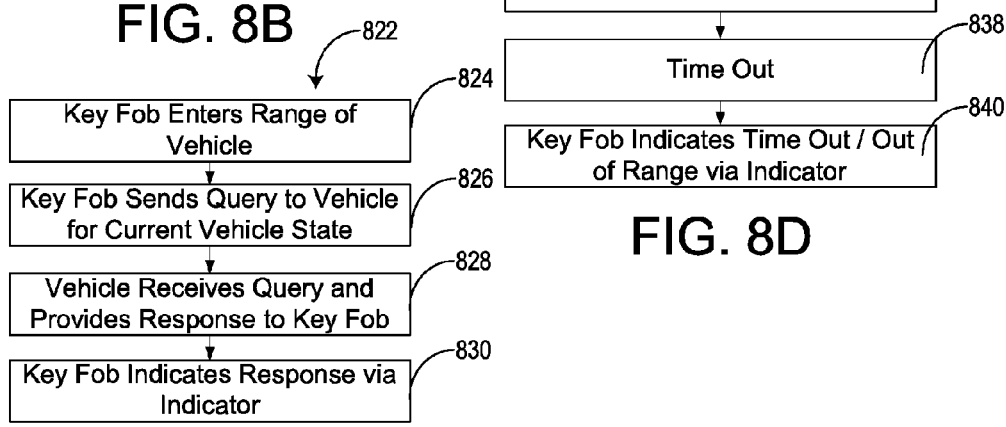
FIG. 8C

BI-DIRECTIONAL PORTABLE ELECTRONIC DEVICE FOR INTERACTION WITH VEHICLE SYSTEMS

CROSS-REFERENCE TO RELATED APPLICATIONS

The present application is a continuation application of U.S. Application Ser. No. 12/811,993, filed Jul. 7, 2010, which is a U.S. National Stage of International Application No. PCT/US2008/088468 filed on Dec. 29, 2008, which claims the benefit of U.S. Provisional Application No. 61/020,077, filed on Jan. 9, 2008. The foregoing applications are incorporated by reference herein in their entirety.

BACKGROUND

The present application relates generally to the field of vehicle communication systems and portable electronic devices. More specifically, the present disclosure relates generally to the field of a key fob configured for interaction with vehicle systems.

Vehicles such as automobiles are typically configured to receive signals from portable electronic devices configured to transmit one or more control signals. Such a portable electronic device might be, for example, a key fob. A key fob is an item that people often carry with their keys, for example, on a ring or a chain. Other such portable electronic devices are built into or form the bow of a key. Yet other such portable electronic devices are not built for coupling to a key and are standalone portable electronic devices (e.g., a mobile phone, a personal digital assistant) for transmitting control signals to the vehicle.

A conventional key fob of the type discussed above is typically only configured to transmit radio frequency signals to a vehicle receiver. Typically the vehicle does not include a transmitter or transceiver for communicating with or back to the key fob.

SUMMARY

One embodiment of the disclosure relates to a portable electronic device for displaying information from a vehicle having a first transceiver to a user carrying the portable device. The portable electronic device includes a second transceiver. The second transceiver is configured to send a first signal from the portable electronic device to the first transceiver. The first signal is configured to cause the vehicle to conduct an activity in response to the signal. The portable electronic device further includes a controller configured to cause the second transceiver to request a status relating to a vehicle parameter from the first transceiver and a second signal is received at the second transceiver and provided to the controller in response to the request. The portable electronic device further includes an indicator configured to change display states in response to commands received from the controller. The controller is configured to cause the indicator to change display states by providing a command to the indicator based on and in response to receiving the second signal.

In some embodiments, the controller can be configured to provide the command to the indicator without storing information relating to the second signal in memory of the portable electronic device. The controller can also be configured to maintain the display state of the indicator that is entered in response to receiving the command until, for example, the indicator is cleared by a user request received by the portable electronic device, a new command is sent to the indicator that changes the indicator's display state, and/or the controller determines that an amount of time has elapsed and causes the indicator to return to a default display state. In some embodiments the portable electronic device can include a memory device and the controller may be configured to provide information relating to the received second signal to the memory device when the second signal is received at the second transceiver. The controller may also be configured to recall the information from the memory device and to provide the command to the indicator based on the recalled information. The indicator can be or include, for example, an LCD display, an OLED display, an LED-based display, one or more LEDs behind a translucent layer, one or more LEDs partially hidden by a opaque layer, one or more light sources behind a colored film, a field emission display, a plasma display, an LED, a light source integrated with a button, a light source beneath a button, and/or a light source configured to light a ring around a button. The portable electronic device may be a key fob configured to attach to a key, to serve as a passive key, to serve as an identification device, to house the key, and/or to act as the key.

Another embodiment of the disclosure relates to a method for displaying information received from a vehicle having a first transceiver using an indicator of a portable electronic device. The method comprises sending a first signal from the portable electronic device to the first transceiver, wherein the first signal is configured to cause the vehicle to conduct an activity in response to the first signal. The method further comprises causing the second transceiver to request a status from the first transceiver relating to a vehicle parameter. The method further comprises receiving a second signal at the portable electronic device in response to the request and using a controller of the portable electronic device to cause the indicator to change display states based on and in response to the second signal.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements, in which:

FIG. 4 is a more detailed embodiment of the vehicle control system of FIG. 3, according to an exemplary embodiment;

FIG. 5 is an illustration of a key fob communicating with a vehicle and/or a computing device external the vehicle, according to an exemplary embodiment;

FIG. 8A is a flow chart of a process for indicating vehicle status information at a key fob indicator, according to an exemplary embodiment;

FIG. 8B is a flow chart of a process for indicating vehicle status information at a key fob indicator, according to another exemplary embodiment;

FIG. 8C is a flow chart of a process for indicating vehicle status information at a key fob indicator, according to yet another exemplary embodiment;

FIG. 8D is a flow chart of a process for indicating vehicle status information at a key fob indicator, according to yet another exemplary embodiment;

DETAILED DESCRIPTION OF THE EXEMPLARY EMBODIMENTS

Before turning to the figures which illustrate the exemplary embodiments in detail, it should be understood that the disclosure is not limited to the details or methodology set forth in the following description or illustrated in the figures. It should also be understood that the terminology employed herein is for the purpose of description only and should not be regarded as limiting.

The vehicle control system as described in FIGS. 1-4 is an example of a vehicle system that may be used in conjunction with embodiments of the bi-directional portable electronic device (e.g., a key fob, cellular phone, personal digital assistant, personal navigation device, etc.) as described in this disclosure. According to alternative exemplary embodiments, other various vehicle systems may be adapted or configured to be used with the bi-directional portable electronic devices described herein. Some of the various vehicle functions configured to be controlled via vehicle-installed user interface electronics as described in FIGS. 1-4 may also (or alternatively) be controlled using a bi-directional portable electronic device as described herein.

Figure 1:
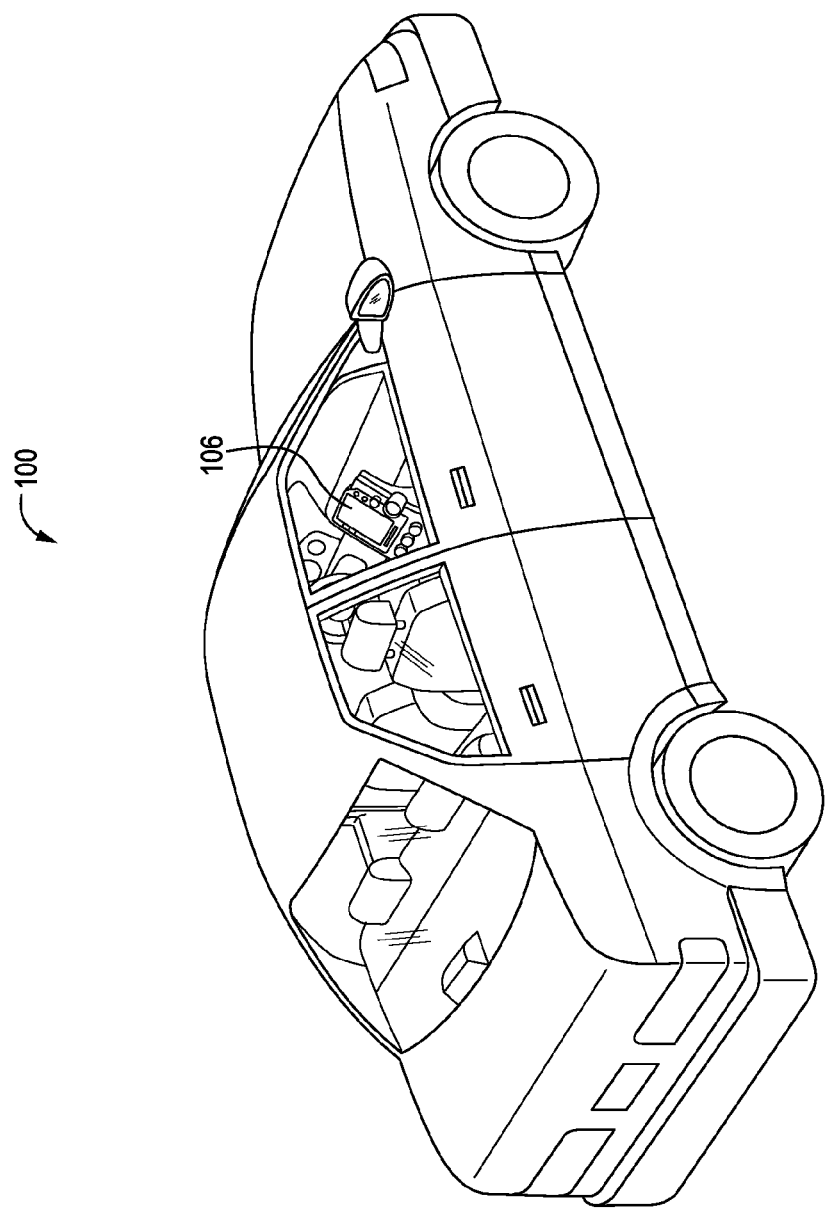
FIG. 1 is a perspective view of a vehicle that includes a number of vehicle systems, including a vehicle control system, according to an exemplary embodiment.

Referring to FIG. 1, a vehicle 100 includes a number of subsystems for user convenience. Vehicle 100 generally includes a heating, ventilation, and air-conditioning (HVAC) system, a sound system, and a vehicle control system 106. The HVAC system and sound system may be coupled to vehicle control system 106, which may be capable of controlling and monitoring both systems and/or a variety of other systems, automatically and/or by a user command.

Figure 2:
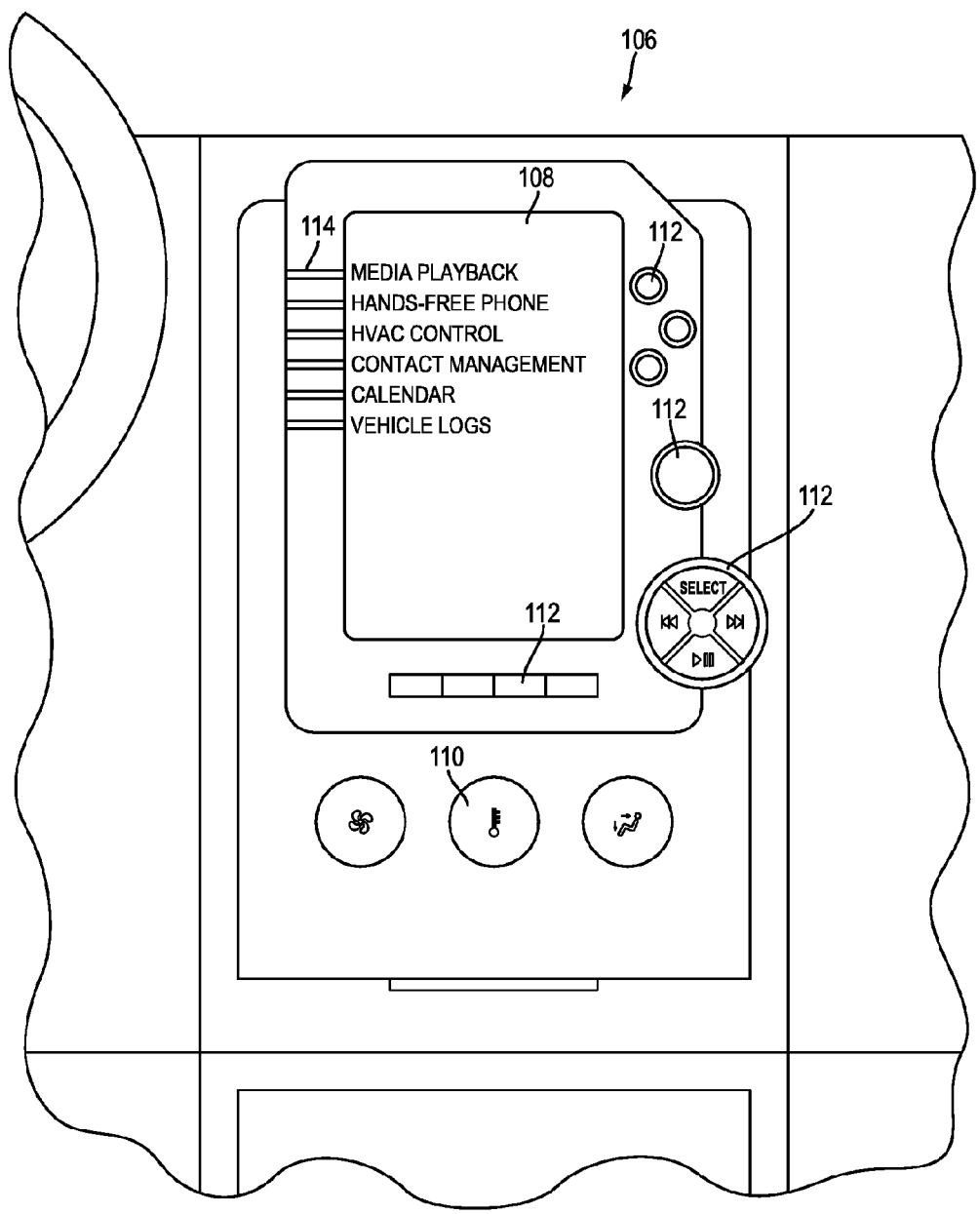
FIG. 2 is a front elevation view of the user interface of the vehicle control system of FIG. 1, according to an exemplary embodiment.

Referring to FIG. 2, one exemplary embodiment of vehicle control system 106 is shown. Vehicle control system 106 generally includes a display 108, one or more knobs 110, one or more pushbuttons 112, and one or more tactile user inputs or pushbuttons 114, which facilitate controlling various vehicle functions. Display 108 may be configured to display data related to the control of the vehicle functions. In one exemplary embodiment, display 108 may be a touch-screen display, while in other exemplary embodiments, may be any other non-touch sensitive display. In still other exemplary embodiments, display 108 may be of any technology (e.g. LCD, DLP, plasma, CRT), configuration (e.g. portrait or landscape), or shape (e.g. polygonal, curved, curvilinear). Knobs 110 and pushbuttons 112 and 114 may be configured: (i) to control functions of the HVAC system such as fan speed, cabin temperature, or routing of air flow, (ii) to control playback of media files over the sound system, (iii) to control retrieval of phonebook entries, or (iv) to control any other desired vehicle function. Pushbuttons 114 typically allow for the selection and display of various functions of vehicle control system 106 including HVAC system control, sound system control, hands-free phone use, contact or address/phone book management, calendar viewing/modification, and vehicle data logging. The operation of pushbutton 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allows the user to connect vehicle control system 106 to a mobile phone so that speaking into the vehicle console of vehicle control system 106 operates the mobile phone. The operation of pushbutton 114 for HVAC control may display a menu screen or execute commands that allow the user to control cabin temperature and air flow by tactile or oral command. The operation of pushbutton 114 for contact management may display a menu screen or execute commands that allow the user to view, list, select, sort, search for, edit and/or dial one or more entries containing personal contact information, by use of a tactile or oral command. The operation of pushbutton 114 for calendar management may display a menu screen or execute commands that allow the user to view, list, select, sort, search for, edit and/or create one or more entries containing personal schedule information by tactile or oral command. The operation of pushbutton 114 for vehicle log management may display a menu screen or execute commands that allow the user to input, view, select and/or reset information related to vehicle operation (e.g. fuel economy, engine temperature, distance to empty, etc.) by tactile or oral command.

Figure 3:
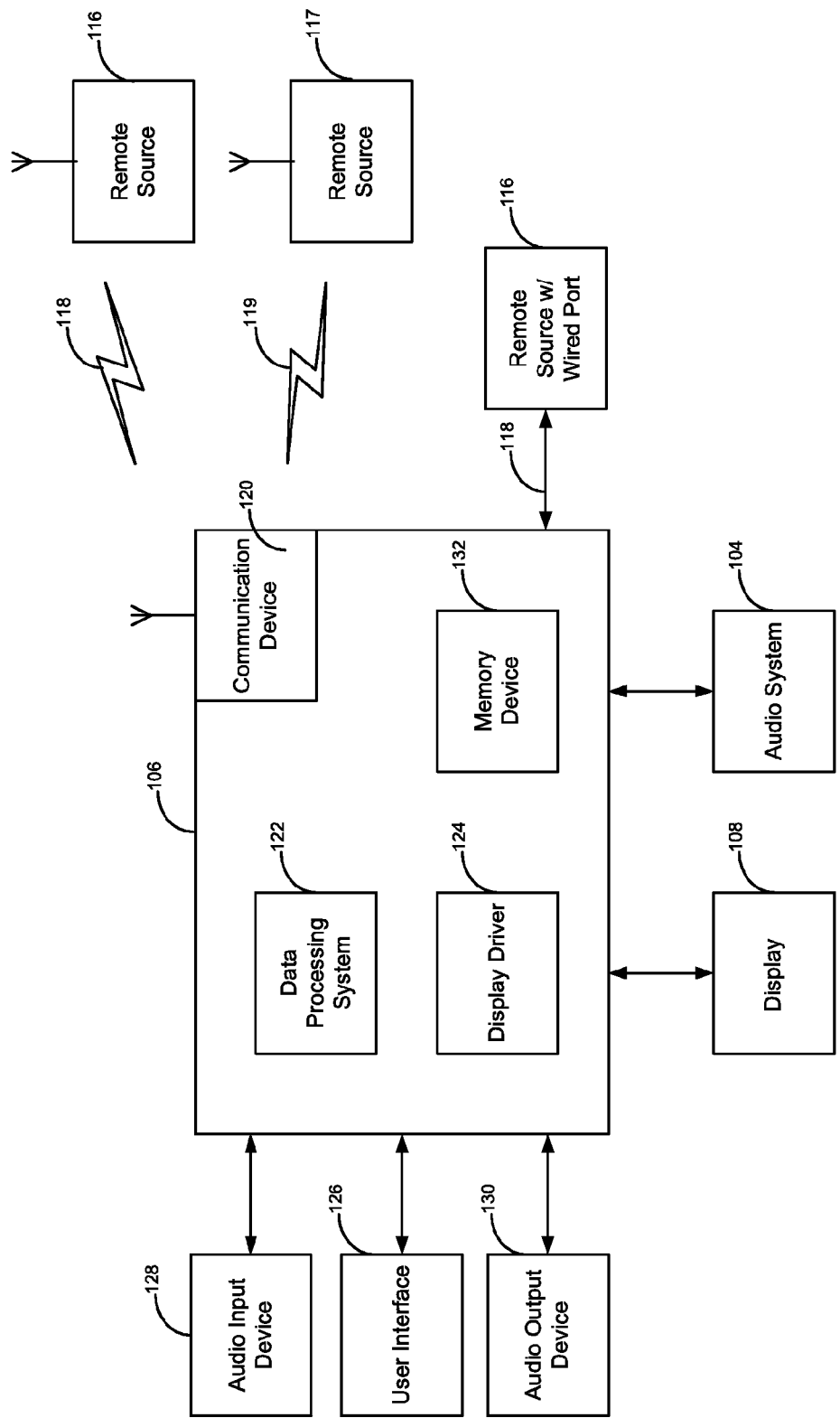
FIG. 3 is a block diagram of the vehicle control system of FIG. 1, according to an exemplary embodiment.

Referring to FIG. 3, vehicle control system 106 is configured to access information and/or data files from a remote source 116 and/or 117 over a communication link 118 and/or 119. For example, vehicle control system 106 may access media data files, phonebook data files, calendar data, or any other accessible information or data.

Vehicle control system 106 is shown to include a communication device 120, a data processing system 122, a display driver 124, a user interface 126, an audio input device 128, an audio output device 130, and a memory device 132.

Communication device 120 is configured to establish communication link 118 with remote source 116 (e.g., a key fob, a mobile phone, a portable electronic device). In one exemplary embodiment, vehicle control system 100 may establish a wireless communication link such as with a Bluetooth communications protocol, an IEEE 802.11 protocol, an IEEE 802.16 protocol, a cellular signal, a Shared Wireless Access Protocol-Cordless Access (SWAP-CA) protocol, or any other suitable wireless technology. In another exemplary embodiment, vehicle control system 100 may establish a wired communication link such as with USB technology, Firewire technology, optical technology, other serial or parallel port technology, or any other suitable wired link. Communication device 120 may receive information and/or one or more data files from remote source 116. In various exemplary embodiments, the information and/or data files may include text, numeric data, or any combination thereof.

Data processing system 122 is coupled to communications device 120 and is generally configured to control each function of vehicle control system 106. Data processing system 122 preferably facilitates speech recognition capabilities of vehicle control system 106 for the convenience of the user. Data processing system 122 may include digital or analog processing components and/or may be of any past, present, or future design that configured to facilitate control of vehicle control system 106 and the activities of vehicle control system 106 described herein.

Display driver 124 is coupled to display 108 and is typically configured to provide an electronic signal to the output display. In one exemplary embodiment, the electronic signal may include the text and/or numeric data of the data files, while in other exemplary embodiments, any other desired data may be included with the text and/or numeric data or by itself in the electronic signal to the output display. In another exemplary embodiment, display driver 124 may be configured to control display 108 with touch-screen capabilities, while in other exemplary embodiments, display driver 124 may be configured to control display 108 without making use of touch-screen capabilities. In still other exemplary embodiments, display driver 124 may be of any past, present, or future design that allow for the control of display 108.

User interface 126 is typically configured to facilitate tactile user interaction with vehicle control system 106. In various exemplary embodiments, user interface 126 may include pushbuttons or rotatable knobs as in the exemplary embodiment of FIG. 2 in any similar or dissimilar configuration or may include other tactile user contact points.

Audio input device 128, for example a microphone, is configured to receive the utterance of a user for transmission to data processing system 122 for speech recognition so that the functions of vehicle control system 106 may be operated by voice command. Audio output device 130, for example a built-in speaker, is configured to provide the user with an audio prompt of various functions, such as user selection confirmation.

Memory device 132 is configured to store data accessed by vehicle control system 106. For example, memory device 132 may store data input by remote source 116, data created by data processing system 122 that may be used later, intermediate data of use in a current calculation, or any other data of use by vehicle control system 106.

Referring to FIG. 4, vehicle control system 106 and remote source 116 are illustrated in greater detail. Data processing system 122 generally includes a text-to-grammar device 134, a speech recognition device 136, and a text-to-speech device 138. Data processing system 122 may include any number of additional hardware modules, software modules, or processing devices (e.g., additional graphics processors, communications processors, etc.).

Text-to-grammar device 134 is preferably coupled to communications device 120 and is generally configured to generate a phonemic representation of text and/or numeric information received by communications device 120 from remote source 116. The phonemic representation of the text and/or numeric information may be configured to facilitate speech recognition of commands, data files, and the like. After conversion of a data file to a phonemic representation, the data file may be accessed via an oral input command received by speech recognition device 136 via audio input device 128. According to an exemplary embodiment, the text-to-grammar device may be able to provide phonemic representations of information received from a remote source.

Speech recognition device 136 is typically configured to receive an oral input command from a user via audio input device 128. Speech recognition device compares the received oral input command to a set of predetermined input commands, options, and/or files, which may have been configured by text-to-grammar device 134. In various exemplary embodiments, the input commands may be related to the playback of a media file, the dialing or input of a phone book entry, the entry or listing of calendar or contact data, the control of the HVAC system, or any other desired function to be performed on data. Speech recognition device 136 may determine an appropriate response to the oral input command received from the user, for example, whether the oral input command is a valid or invalid instruction, what command to execute, or any other appropriate response. According to an exemplary embodiment, the speech recognition device may be able to trigger or activate a display reproduction mode when certain commands are recognized. Furthermore, the speech recognition device may be able to pass commands to a remote device to facilitate interactive control of a remote source via a communication link.

Text-to-speech device 138 is generally configured to convert the text and/or numeric data of each data file received from remote source 116 into an audible speech representation. This functionality may allow vehicle control system 106 to audibly give information/data to the user via audio output device 130 or the sound system. For example, vehicle control system 106 may repeat a user selected function back to the user, announce media file information, announce a vehicle status, provide phonebook or contact information, or other information related to data stored in memory 132, remote source 116, a remote server, etc. According to an exemplary embodiment, the text-to-speech device may be able to provide an audible speech representation of information received from a remote source.

Memory device 132 includes both a volatile memory 140 and a non-volatile memory 142. Volatile memory 140 may be configured so that the contents stored therein may be erased during each power cycle. Non-volatile memory 142 may be configured so that the contents stored therein may be retained across power cycles, such that upon vehicle control system and/or vehicle power-up, data from previous system use remains available for the user. According to an exemplary embodiment, the non-volatile memory may store one or more user profiles, display profiles, communication profiles, navigation profiles, or any other type of user or system setting file.

According to an exemplary embodiment, remote source 116 may be any remote source that includes a transceiver (e.g., a transmitter and a receiver) and is able to interface with vehicle control system 106 over communication link 118, in either a wireless or wired embodiment. In various exemplary embodiments, the remote source may be a portable electronic device such as a key fob, a mobile device or phone 144, a personal digital assistant (PDA) 146, a media player 148, a personal navigation device (PND) 150, and/or a pager 152. In other exemplary embodiments, the remote source may be a remote server 154 that is coupled to the Internet, or various other remote data sources. The remote source may have a storage device, one or more processing devices, and one or more communication devices. According to various exemplary embodiments, the remote source (e.g., mobile device 144) may connect to the Internet, remote server 154, or any other remote source with a first communication device 156 while communicating with vehicle control system 106 using a second communication device 158. In an exemplary embodiment where mobile device 144 is a mobile phone, first communication device 156 may communicate with the remote source via a cell phone tower 160 or other data relay station.

Referring to FIG. 5, a portable electronic device 162 is shown in wireless communication with vehicle 100 and/or workstation 168. Portable electronic device 162 is shown to include three buttons 164 that may be used to control vehicle functions. The vehicle functions may be, for example, unlocking a vehicle door, locking a vehicle door, opening a vehicle door, closing a vehicle door, starting a vehicle engine, unlocking a trunk, opening a trunk, unlocking a rear hatch, opening a rear hatch, providing an alarm relating to the vehicle, triggering an alarm or alarm system related to the vehicle, triggering wireless synchronization with vehicle 100, a node 167, or a workstation 168, starting a vehicle engine, and the like. While portable electronic device 162 is illustrated as having three buttons, according to other exemplary embodiments portable electronic device 162 may include more or fewer buttons. According to various exemplary embodiments, portable electronic device 162 includes an indicator such as a light emitting diode (LED) 166. Portable electronic device 162 is configured to indicate the status of vehicle 100, a change in status of vehicle 100, or any other vehicle property based on information received from vehicle 100 via LED 166. According to an exemplary embodiment, portable electronic device 162 may be configured to confirm whether a function was performed or not. For example, a user may press a button 164 on portable electronic device 162 to actuate a vehicle function (e.g., lock/unlock the door, operate the windows, etc.) and if the function is not performed (e.g., as determined from information received from vehicle 100, by the absence of information received from vehicle 100, etc.), portable electronic device 162 may present an error code or indication by flashing LED 166 or another indicator, flashing two indicators, presenting a steady indication, etc. Portable electronic device 162 may also be configured to request a status relating to a vehicle parameter from vehicle 100. When a response to the status request is received, portable electronic device 162 can change the display state of an indicator (e.g., an LED) of portable electronic device 162. The indicator may be an LED such as LED 166, may be of a single color or multiple colors, and may include a single LED or multiple LEDs. The shape of LED 166 may be generally spherical as illustrated, may be embedded and/or "sticking out" from portable electronic device 162 in a variety of ways, or may be any other shape.

According to another exemplary embodiment, portable electronic device 162 may include another type of indicator (e.g., display) other than or in addition to LED 166; for example, the indicator may be or include an LCD display, an OLED display, an LED-based display, one or more LEDs behind a translucent layer, one or more LEDs partially hidden by a opaque layer, one or more light sources behind a colored film, a field emission display, a plasma display, an LED, a light source integrated with a button, a light source beneath a button, and/or a light source configured to light a ring around a button. According to various exemplary embodiments, any indicator/display technology of past, present, or future may be used for or included on portable electronic device 162. The indicator may include a screen or other structure which may be, include, or be configured to display symbols, pictures, or other graphics to represent vehicle properties (e.g., a lock to indicate if the vehicle is locked or unlocked) and may be of any size or shape and may be located in various places on portable electronic device 162. According to various exemplary embodiments, portable electronic device 162 may be configured to display different types of indicators in combination. For example, portable electronic device 162 may include fixed icons, reconfigurable dot matrix indicators, and/or any other type of fixed or reconfigurable indicator. Portable electronic device 162 also includes a hole in which a ring may be placed, used to hold keys and other objects. Portable electronic device 162 may also or alternatively include or be attached to a vehicle key or may not include a hole for holding the key and instead include a passive entry system. For example, when portable electronic device 162 comes within a predetermined range of the vehicle (e.g., within 100 feet, within 50 yards, within 50 feet, within 10 yards, etc.) portable electronic device 162 may automatically actuate vehicle functions such as the door locks, vehicle engine, personal seat settings, radio settings, and/or other settings or functions. Portable electronic device 162 may also include various latches, slots, and other features to allow other objects to physically couple to portable electronic device 162 and to allow portable electronic device 162 to attach in a variety of ways to a variety of objects. It should be noted that portable electronic device 162 may communicate with devices or couple to devices (e.g., a portable media player, a PDA, a PND, etc.) via any physical or wireless connection (e.g., a Bluetooth connection, a wireless USB connection, etc.).

According to another exemplary embodiment, portable electronic device 162 may send a signal to vehicle 100 to trigger communication from vehicle 100 to a third device, such as a cellular phone, a personal navigation device, a personal digital assistant, an external network or server, or any other device capable of communication with vehicle 100. The communication between vehicle 100 and the third device may use any type of wireless communication technology or protocol that may be different or the same as the protocol used for communication between portable electronic device 162 and vehicle 100. For example, portable electronic device 162 may communicate with vehicle 100 to command a cell phone connected to vehicle 100 to dial a phone number. Once the number is dialed, the user may engage in a phone conversation using a microphone and speaker in portable electronic device 162.

Portable electronic device 162 is shown having a wireless communication link with vehicle 100. A user of portable electronic device 162 may press a button 164 or provide other tactile input received by portable electronic device 162 to cause a command, request, or other data to be sent to vehicle 100. Vehicle 100 may respond and provide data for portable electronic device 162 or to another device. Portable electronic device 162 may interpret the data and cause an indicator such as a LCD display or a LED 166 of portable electronic device 162 to change display states based on the data. Vehicle 100 may also have a wireless communication link with node 167 of workstation 168, other area, a remote source, or other device. This link may allow data regarding the vehicle status or vehicle properties to be sent to another computing device (e.g., the command or request from the portable electronic device can trigger the transmission of the vehicle status or vehicle properties to be sent to the another computing device).

Figure 6A:
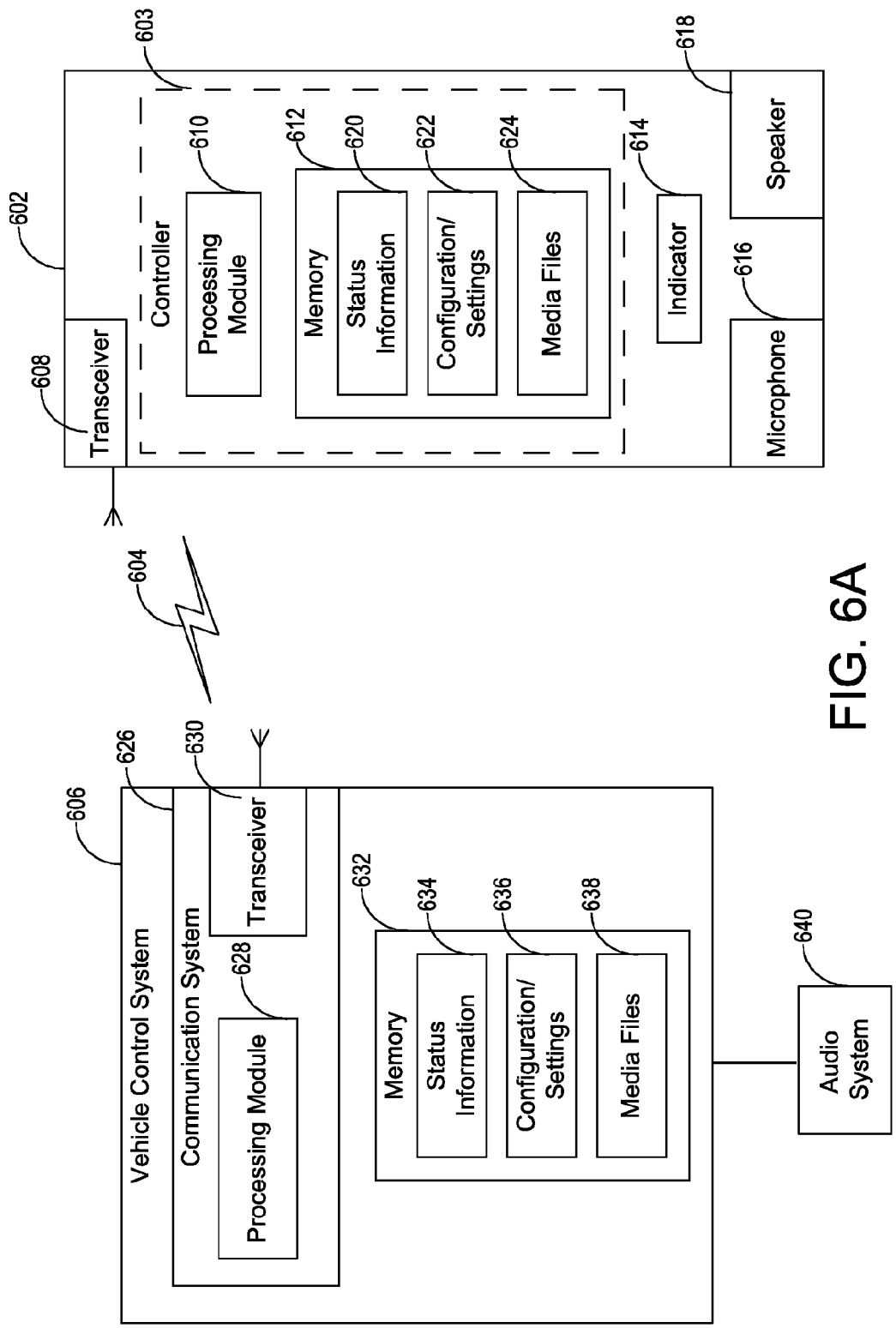
FIG. 6A is a block diagram of a portable electronic device and a vehicle control system with which the portable electronic device is configured to communicate, according to an exemplary embodiment.

Referring to FIG. 6A, a block diagram of a portable electronic device 602 for communicating with a vehicle control system 606 is shown according to an exemplary embodiment. Portable electronic device 602 is shown to include a transceiver 608 (e.g., an RF transceiver), a controller 603 including a processing module 610 and a memory 612, an indicator 614, a microphone 616, and a speaker 618. Transceiver 608 may be any transceiver and/or transmitter and receiver pair configured to transmit and receive information to and from vehicle control system 606 over a wireless communications link 604. Transceiver 608 may be implemented on a single integrated circuit, a transmitter and receiver mounted on a single circuit board, a transmitter and receiver that are a part of a single flexible circuit, or a transmitter and receiver distributed across multiple integrated circuits, circuit boards, and/or flexible circuits. For example, transceiver 608 may be a separate transmitter and a separate receiver housed in the same portable electronic device and indirectly coupled by a controller and/or other control circuitry. According to an exemplary embodiment, transceiver 608 is configured to send a signal to vehicle control system 606, the signal configured to cause the vehicle control system 606 to check for and to provide response information back to device 602 (e.g., vehicle status information, command confirmation information, etc.).

Controller 603 may be generally configured to cause transceiver 608 to request the information (e.g., vehicle status information) from vehicle control system 606 and to process signals received from vehicle control system 606 via transceiver 608. Controller 603 may be configured to use the received information to change various properties of device 602. For example, controller 603 may cause indicator 614 to change display states via a command based on the received information. According to an exemplary embodiment, controller 603 may provide the command to indicator 614 without storing information received in memory 612. According to another exemplary embodiment, controller 603 may store the received information in memory 612 upon receipt of the signal from vehicle control system 606. Controller 603 can be a circuit (e.g., multiple circuit boards, one circuit board, a flexible circuit, a circuit having distributed parts, etc.) for completing the activities described herein. According to various embodiments, transceiver 608 can be integrated with and/or included on controller 603. According to other various exemplary embodiments, controller 603 is communicably coupled (e.g., directly, indirectly, etc.) to transceiver 608.

Processing module 610 is configured to process data to facilitate communication of information over wireless link 604, to store and/or retrieve data from memory 612, to process data for output to display 614, to process vocal information received from microphone 616, and/or to output audible data to speaker 618. Processing module 610 may be a microprocessor, multiple microprocessors, a hardwired circuit, a programmable gate array, or any other digital and/or analog circuit capable of completing/facilitating one or more functions of portable electronic device 602. According to various exemplary embodiments, processing module 610 may also be used to analyze user inputs provided to a graphical user interface (GUI), tactile user interface (TUI), and/or voice driven user interface (VUI) of portable electronic device 602. Memory 612 is configured to store data related to portable electronic device 602 and/or vehicle 100. Memory 612 can include status information 620 related to a current and/or previous vehicle state (e.g., door lock/unlock state, engine status, etc.). Memory 612 can also include information 622 related to a configuration or setting for portable electronic device 602 (e.g., display settings, programmable button settings, threshold data for automatic alerts, etc.). Memory 612 also includes information 624 related to media files. Memory 612 may store media files (e.g., an mp3, a .wav file, etc.) or data related to media files stored in vehicle control system 606. Memory 612 may be any volatile or non-volatile memory configured to store data related to portable electronic device 602 or vehicle 100. Controller 603 can recall information from memory 612 to set, change, reset, or otherwise control a display state of indicator 614.

Indicator 614 can be configured to provide an indication of a vehicle status (e.g., door lock state, fluid levels, HVAC status, etc.) using a light or lights, graphics, symbols, text, or any other indication. Indicator (or display) 614 may be one or more LEDs, an LCD display, a TFT display, dot matrix, reconfigurable display, or any other display capable of providing vehicle status information. Indicator 614 is configured to change display states upon receiving commands and/or signals from controller 603, according to an exemplary embodiment.

Microphone 616 is configured to receive oral commands that may actuate a vehicle function or request a vehicle status. Portable electronic device 602 may record messages spoken into microphone 616 for storage in memory 612 or for transmission to vehicle control system 606. According to an exemplary embodiment, portable electronic device 602 can include a speech recognition module configured to recognize speech received at microphone 616 as one or more commands for a vehicle. Portable electronic device 602 can send a signal representative of the one or more commands to the vehicle.

Speaker 618 is configured to provide audible feedback to the user. Speaker 618 may provide an audible indication of a vehicle status, may be configured to playback media files stored on portable electronic device 602 or in vehicle control system 606, and/or can be used to provide other audible information to the user.

Referring still to FIG. 6A, vehicle control system 606 includes a communication system 626 (e.g., that may be similar or different than communication device 120 shown in FIGS. 3 and 4) that is shown to include a processing module 628 and a transceiver 630. Vehicle control system 606 is further shown to include a memory 632 configured to store data related to portable electronic device 602 and/or the vehicle. Memory 632 is shown to include status information 634 related to a current and/or previous vehicle state (e.g., door lock/unlock state, engine status, etc.). Memory 632 is also shown to include information 636 related to the configuration or settings of portable electronic device 602 (e.g., display settings, threshold data for automatic alerts, etc.). Memory 632 is yet further shown to include information 638 related to media files. Memory 632 can store media files (e.g., an mp3, a .wav file, etc.) or data related to media files stored in portable electronic device 602 or another remote device. Memory 632 may be any volatile or non-volatile memory capable of storing data related to portable electronic device 602 or vehicle 100. Vehicle control system 606 is typically coupled to an audio system 640 for playback of media files or for providing audible indicators related to vehicle status.

According to an exemplary embodiment, memory 612 of portable electronic device 602 may be configured to store information for vehicle 100 and/or information relating to portable electronic device 602. Memory 632 of vehicle control system 606 and memory 612 of portable electronic device 602 may store the same types of data or different types of data. Portable electronic device 602 may store personal settings or preference information that may be used with multiple vehicles to passively or actively transfer the settings or preferences to the vehicle. The personal settings or preferences may include seat height, seat position, radio settings, lighting settings, etc. Vehicle control system 606 may also transfer user settings and preferences to portable electronic device 602 for later use in configuring the same or another vehicle. According to an exemplary embodiment, a first vehicle control system 606 can be used to create or set personal settings or preferences for one vehicle and to control the transfer of the settings or preferences to memory of the portable electronic device (e.g., via a wired or wireless connection). The portable electronic device, upon user request at the portable electronic device (e.g., by pressing down multiple buttons) can be configured to transmit the settings or preferences to a vehicle control system of another vehicle. According to other various exemplary embodiment, when a wireless communication link is established between the portable electronic device and the another vehicle, the portable electronic device causes the settings to be transferred to the another vehicle. According to yet other exemplary embodiments, once the portable electronic device stores a particular setting (e.g., a seat setting, an HVAC setting, a radio setting, etc.), the portable electronic device can broadcast the information to any vehicle with which the portable electronic device is configured to work. So, for example, the portable electronic device can be configured to transmit the settings with (or after) a command for unlocking a vehicle door; if the vehicle control system is compatible, the vehicle control system can adjust the vehicle settings before the user actually gets into the vehicle.

Figure 6C:
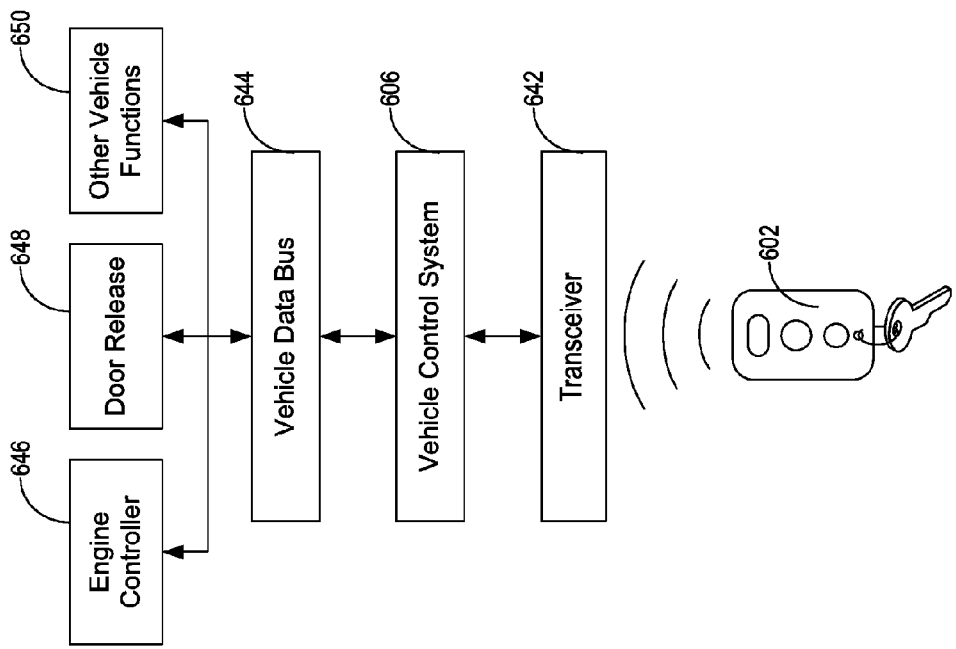
FIGS. 6B-6E are block diagrams of a portable electronic device configured to communicate with various exemplary vehicle systems, according to an exemplary embodiment.
Figure 6B:
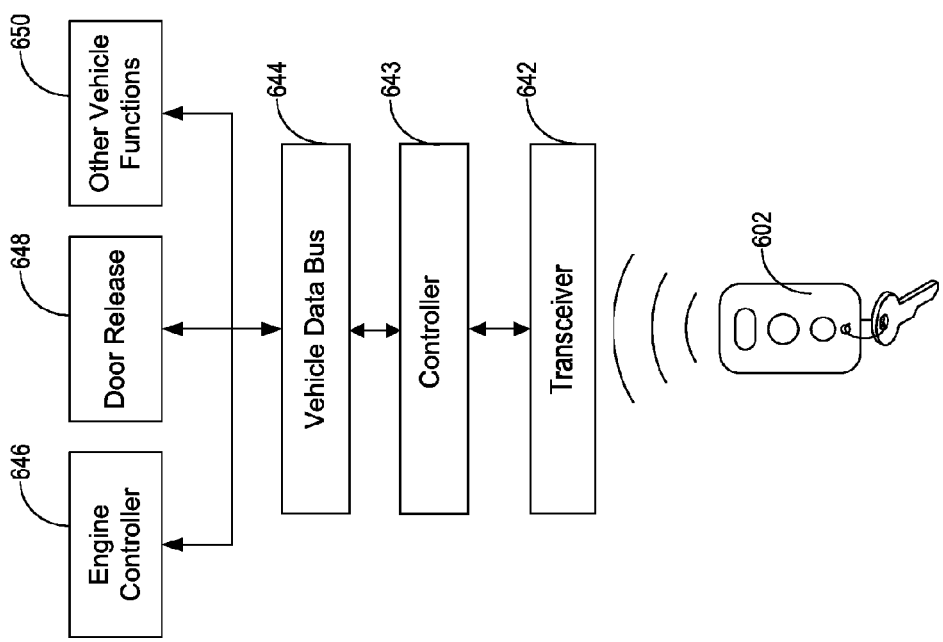

Referring to FIG. 6B, a block diagram of a system for communicating between portable electronic device 602 and a vehicle (e.g., vehicle 100) is shown, according to an exemplary embodiment. Portable electronic device 602 is shown in communication with transceiver 642 located in the vehicle. Transceiver 642 may be located anywhere in the vehicle (e.g., on the roof of the vehicle, on the dashboard, etc.).

Transceiver 642 may be coupled to a vehicle data link such as a vehicle data bus 644 via a controller 643. Vehicle data bus 644 may be any bus, link, network, or communication medium configured to communicate information between vehicle subsystems. Vehicle subsystems, such as an engine controller 646, a door release system 648, or another subsystem for other vehicle functions 650, can communicate with portable electronic device 602 via vehicle data bus 644 and transceiver 642. Portable electronic device 602 may send a signal or command to turn on the engine of the vehicle or unlock the doors of the vehicle, and the command may be provided (e.g., routed) to the proper vehicle subsystem via vehicle data bus 644. Transceiver 642 can communicate information back to portable electronic device 602 (e.g., for display via an indicator of portable electronic device 602).

Referring to FIG. 6C, a block diagram of a system for communication between a portable electronic device 602 and a vehicle (e.g., vehicle 100) is shown, according to another exemplary embodiment. Transceiver 642 is shown coupled to vehicle control system 606 of the vehicle. A command, request, or setting sent by portable electronic device 602 may be relayed to the various vehicle subsystems 646-650 through vehicle control system 606, and the various vehicle subsystems may provide a response to vehicle control system 606 for communication to portable electronic device 602 via transceiver 642.

Figure 6E:
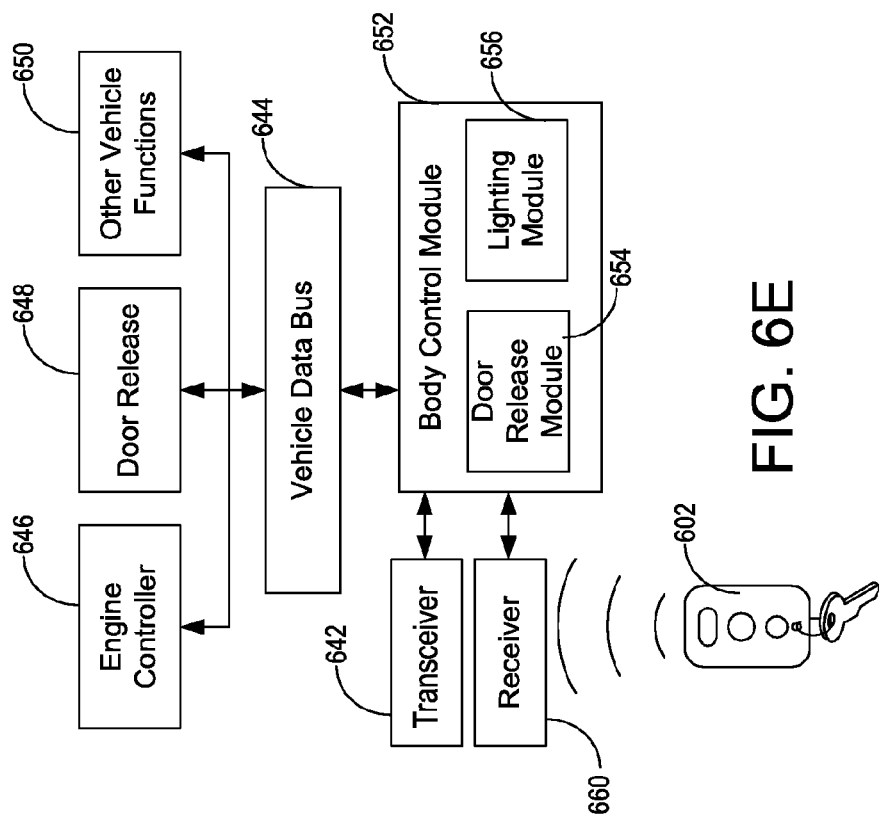
Figure 6D:
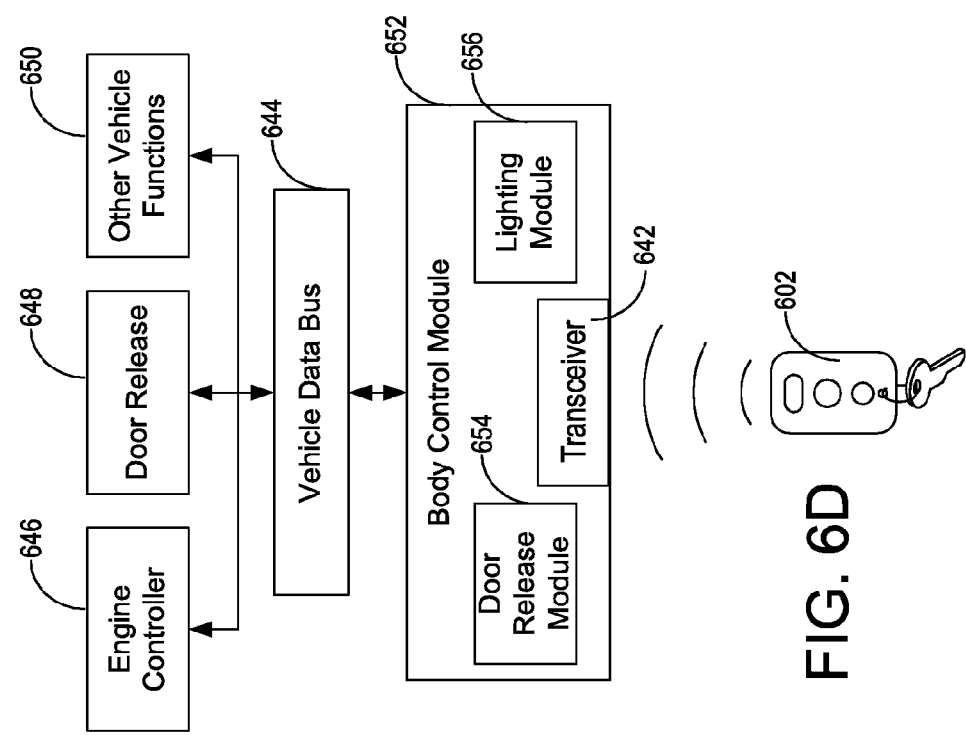

Referring to FIG. 6D, transceiver 642 of FIG. 6C may be included in a body control module 652 instead of or in addition to being coupled to vehicle control system 606. Body control module 652 is shown to include a door release module 654 and a lighting module 656, but may include any additional and/or alternative modules. Body control module 652 may communicate with vehicle data bus 644 and various other vehicle functions.

Referring to FIG. 6E, signal transceiver 642 may be external and communicably coupled to body control module 652 (and/or vehicle control system 606) via a wired connection. A signal receiver 660 may be coupled to body control module 652 (and/or vehicle control system 606) in addition to or instead of signal transceiver 642.

Figure 7:
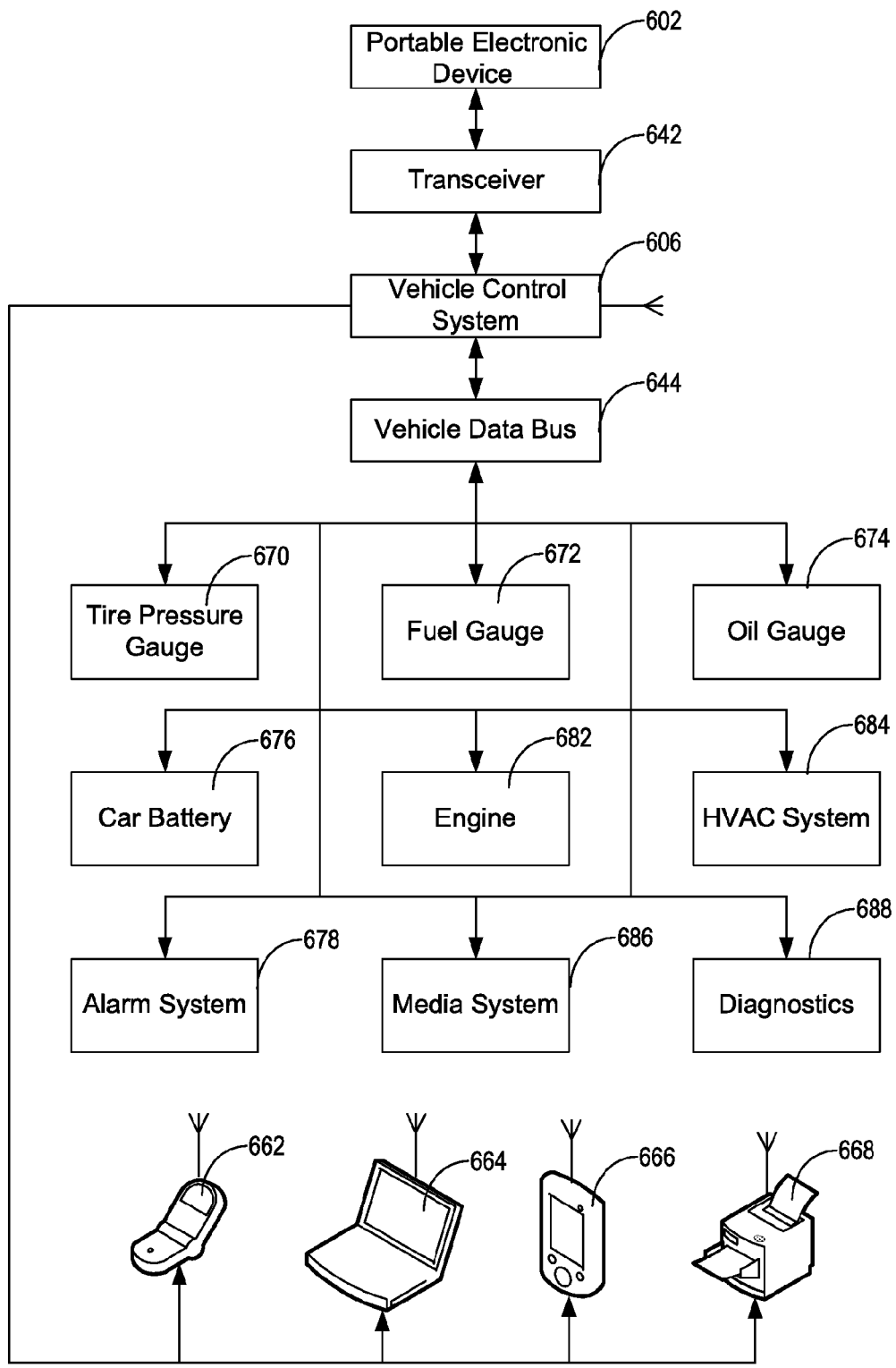
FIG. 7 is a block diagram of a portable electronic device communicating with a vehicle control system, according to an exemplary embodiment.

Referring to FIG. 7, the block diagrams of FIGS. 6B and 6C are shown in greater detail. Vehicle control system 606 may be used to communicate with various devices (e.g., a cell phone 662, a laptop 664, a PDA 666, a printer 668, etc.) not associated with the vehicle (e.g., vehicle 100), either wirelessly or via a wired connection. The devices may be used in parallel with portable electronic device 602 (or otherwise) to provide a user of the vehicle with vehicle information or with information from a remote system (e.g., a mobile phone system, a wireless service organization, a remote server, etc.). For example, vehicle control system 606 may provide information regarding the vehicle to a user of the vehicle via both a device and portable electronic device 602. Portable electronic device 602 may receive data and operate a local LED, indicating an alert for a user of the vehicle. Vehicle control system 606 may also transmit data (e.g., a text message, a voice mail, an e-mail, a page, etc.) to cell phone 662, laptop 664, PDA 666, or printer 668 belonging to the user, providing details of the alert indicated by portable electronic device 602. The information may be sent based on a user request or automatically based on predetermined conditions (e.g., alarm conditions, a lock condition, etc.). This activity may be used to, for example, communicate that a door was left unlocked to a user of the vehicle.

Various vehicle subsystems are shown in FIG. 7 that may be controlled or operated using portable electronic device 602. Portable electronic device 602 may communicate wirelessly with the vehicle subsystems or may form a wired connection with vehicle control system 606 and communicate to the vehicle subsystems via a wired connection.

The vehicle subsystems can include gauges, such as a tire pressure gauge 670 to alert when an abnormal tire pressure is detected (e.g., when a tire is punctured), a fuel gauge 672 to alert when the vehicle is running low on fuel, an oil gauge 674 to alert when the oil level of the vehicle is running low, a car battery gauge or indicator 676 to alert when the battery of the vehicle is low, and/or any other sensors, circuits, or gauges. The various vehicle subsystems may alert vehicle control system 606, which sends a signal to be received, interpreted, and/or displayed by portable electronic device 602. Other vehicle subsystems, such as an alarm system 678 or a diagnostics system 688, may transmit data to portable electronic device 602 via vehicle control system 606, alerting the user of the vehicle of a problem even when the user is remote from the vehicle (e.g., walking away from and/or to the vehicle). For example, diagnostics system 688 may be used to detect vehicle problems and provide an appropriate message to a user of the vehicle via the portable electronic device.

The vehicle subsystems may also include an engine 682 (e.g., engine control unit), which may receive a command from portable electronic device 602 to start the vehicle or to shut-down the vehicle. Another subsystem may be an HVAC system 684 of the vehicle. Portable electronic device 602 may transmit a signal or setting to operate the HVAC system 684 from outside the vehicle (e.g., to start the heater before a user walking toward the vehicle actually gets in the vehicle).

Other vehicle subsystems, for example a media system 686, may accept an input from portable electronic device 602 and provide feedback via a display output 108 or audio system 104 of vehicle 100. For example, if media files are stored in memory 612 of portable electronic device 602, the media files may be displayed and/or played back on display 614 of portable electronic device 602. Status information 620 stored in portable electronic device 602 may also be shown or played back on vehicle control system 606. The GUI/VUI of vehicle control system 606 may be used to edit the configuration data of portable electronic device 602.

Referring to FIGS. 8A-8D, various activities/processes are described with reference to a portable electronic device embodied as a key fob. The key fob may generally be configured to attach to a key and/or to serve as a passive key for a vehicle ignition. In various alternative embodiments the key fob may be any portable electronic device configured to wirelessly communicate with the vehicle.

Referring to FIG. 8A, a flow chart of a process 800 for communication between a key fob and a vehicle (e.g., vehicle 100) is shown, according to an exemplary embodiment. A communication link may first be formed between the key fob and vehicle (step 802). The communication link may be formed when a user triggers the event (e.g., pressing a button) or automatically when the key fob enters the wireless range of the vehicle. A command is sent from the key fob to the vehicle (step 804). According to various exemplary embodiments the key fob may be configured to send the command to the vehicle via a broadcast mechanism before or independently of a communication link being formed between the key fob and the vehicle. The command may relate to the pressing of a button or use of another tactile input on the key fob by a user of the vehicle. The command may also be triggered automatically (e.g., in response to a communication link between the key fob and the vehicle system being formed, in response to a timer, in response to a number of criteria, etc.). A vehicle system (e.g., the vehicle control system of FIGS. 1-4) receives the command and makes an attempt to execute the command (step 806). After the attempt to execute the command, the vehicle sends a signal via a communication device of a vehicle system back to the key fob relating to the success or failure of executing the command (step 808). The key fob may receive the information and provide a response for the user of the vehicle via an indicator of the key fob (step 810). For example, a controller of the key fob may be configured to cause an indicator of the key fob to change display states based on the response wirelessly received from the vehicle system. The indicator of the key fob may generally maintain the display state until the indicator is cleared by user request received at the key fob or other portable electronic device, a new command is sent to the indicator that changes the display state of the indicator, or the key fob controller determines that a pre-determined amount of time has elapsed and causes the indicator to return to a default display state.

Referring to FIG. 8B, a flow chart of a process 812 for communication between a key fob and a vehicle (e.g., vehicle 100) is shown, according to an exemplary embodiment. The user may press a button or use another tactile input to initiate the process (step 814). The pressing of the button may cause the transmission of a specific command or query relating to a vehicle state (e.g., a power state, a lock state, a battery level state, a trunk state, etc.) (step 816). The vehicle receives the query and provides a response to the key fob (step 818). A controller of the key fob displays an interpretation of the response via an indicator on the key fob (step 820).

Referring to FIG. 8C, a flow chart of a process 822 for communication between a key fob and a vehicle (e.g., vehicle 100) is shown, according to an exemplary embodiment. The key fob may initiate the process by coming into a wireless range of the vehicle (step 824). Once the process is initiated, the key fob sends a query to the vehicle system of the vehicle regarding the current state of the vehicle (step 826). The vehicle receives the query and provides a response to the key fob (step 828). The response is received and processed by the key fob (e.g., decoded, demodulated, decrypted, interpreted, etc.) to indicate the response via an indicator on the key fob (step 830).

Referring to FIG. 8D, a flow chart of a process 832 for communication between a key fob and a vehicle (e.g., vehicle 100) is shown, according to an exemplary embodiment. When a user presses a button on the key fob (step 834), the key fob attempts to send a query to the vehicle requesting the current vehicle state (step 836). After the request is made, the key fob enters a timeout state for a predetermined amount of time (e.g., between about 1 millisecond and 2 seconds, between about 100 ms and 1 s, between about 250 ms and 750 ms, etc.) (step 838). If no signal is received from the vehicle, the key fob indicates that the request timed out or that the key fob may be out of range, for example by blinking one or more lights, by showing a red light, etc (step 840).

Figure 8E:
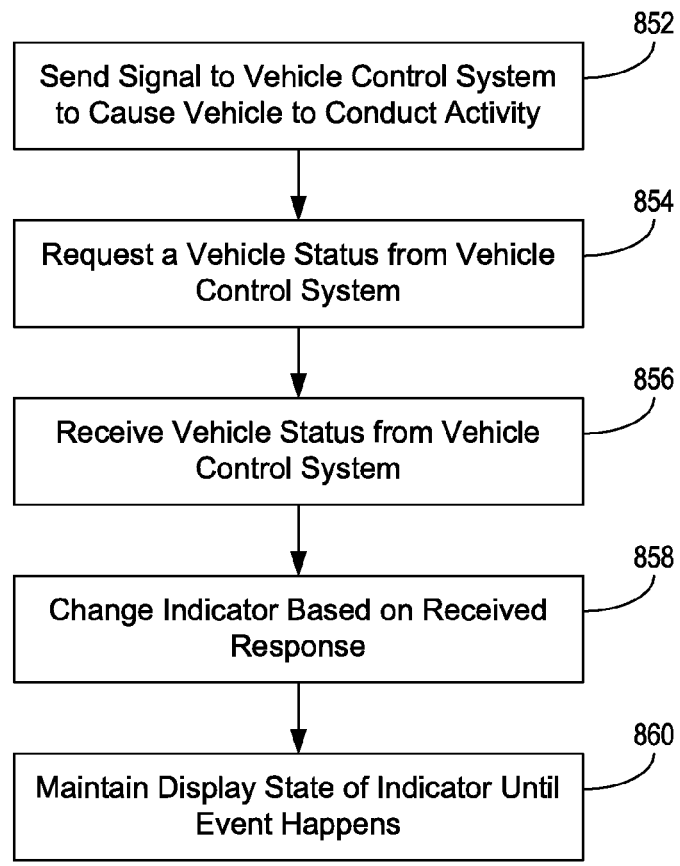
FIG. 8E is a flow chart of a process for displaying information from a vehicle on an indicator of a portable electronic device, according to an exemplary embodiment.

Referring now to FIG. 8E, a flow chart of a process 850 for displaying information received from a vehicle using an indicator of a portable electronic device (e.g., key fob) is shown, according to an exemplary embodiment. A signal may be sent from the portable electronic device to the vehicle (step 852) which is configured to cause the vehicle to conduct an activity in response to the signal. For example, the vehicle may unlock, lock, open, or close doors of the vehicle, start a vehicle engine, trigger a vehicle alarm, or otherwise. The portable electronic device can then wirelessly request a status of the vehicle (e.g., via a transceiver of the vehicle) (step 854) and may receive a signal regarding the vehicle status in response to the request (step 856). A controller of the portable electronic device can process the response and cause an indicator of the portable electronic device to change display states based on the response (step 858). According to exemplary embodiments, the controller may be configured not to store the received information (e.g., of the response) in a memory device or may be configured to store the received information in a memory device upon receiving the information. According to another exemplary embodiment, the controller may use information stored in memory of the portable device to generate commands for the indicator.

The controller may be configured to cause the indicator to maintain an indicator display state after it is set (step 860). According to various exemplary embodiments, the controller is configured to hold the indicator's display state unless the indicator is cleared by user request, a new command is sent to the indicator that changes the display state, or until the controller determines that the indicator should return to a default display state based on time elapsed.

As an exemplary of activity that may be conducted or enabled by the portable electronic device, when locking or unlocking a vehicle door or other entry point (e.g., a trunk), the portable electronic device may query for and receive the door lock state. The portable electronic device may indicate the door lock state to the user via an indicator such as one or more solid and/or blinking LEDs of one or more colors. For example, a red blinking LED may indicate that the lock/unlock command failed and the door remains unlocked while a green LED may indicate that the command was successful and the door is locked. The user may also request various other current or last vehicle statuses. If RF communication is not possible or responsive, the last lock state (e.g., stored in a memory of the portable electronic device) may be displayed (e.g., and/or another indication regarding the communication failure may be displayed, the information button may be highlighted, LEDs for both lock or unlock may be lit or flashed, etc.). Status information that can be requested from the vehicle may include a confirmation of vehicle activity, an error code, a vehicle state relating to an activity in response to a signal send to the vehicle by the portable electronic device, a fuel level of the vehicle, a battery charge level of the vehicle, a vehicle parameter, a locked and/or unlocked state of the vehicle, or an alarm condition of the vehicle.

While the portable electronic device is illustrated in the figures as having specific dimensions, ranges, processing architecture, etc., according to other exemplary embodiments, any size, range, or architecture may be used so that the portable electronic device is capable of bidirectional communication with the vehicle and capable of indicating vehicle status to the user. For example, the portable electronic device may have dimensions of 55 mm by 40 mm by 17 mm, 70 mm by 40 mm by 20 mm, or any other dimension set or size. According to various exemplary embodiments, the portable electronic device may have a range of <80 m, 80 m, 100 m, 600 m, 1000 m or any other radio-frequency range. According to various exemplary embodiments, the processing architecture of the portable electronic device may include a Philips PCF7936 microprocessor, a Philips PCF7941 microprocessor, a Philips PCF 7945 microprocessor, an Atmel ATA5824 microprocessor, or any other microprocessor capable of and/or configured to facilitate the activities described herein. According to an exemplary embodiment, the vehicle may include a low-frequency immobilizer function and system that are configured to prevent the vehicle from starting unless a valid low-frequency signal is received from the key fob. Accordingly, the key fob may include a low-frequency transmitter that is configured to send the low-frequency signal to the vehicle to allow it to start. The low frequency signal may be between about 1 kHz and 500 kHz, between about 50 kHz and 300 kHz, about 125 kHz, etc.

Figure 9:
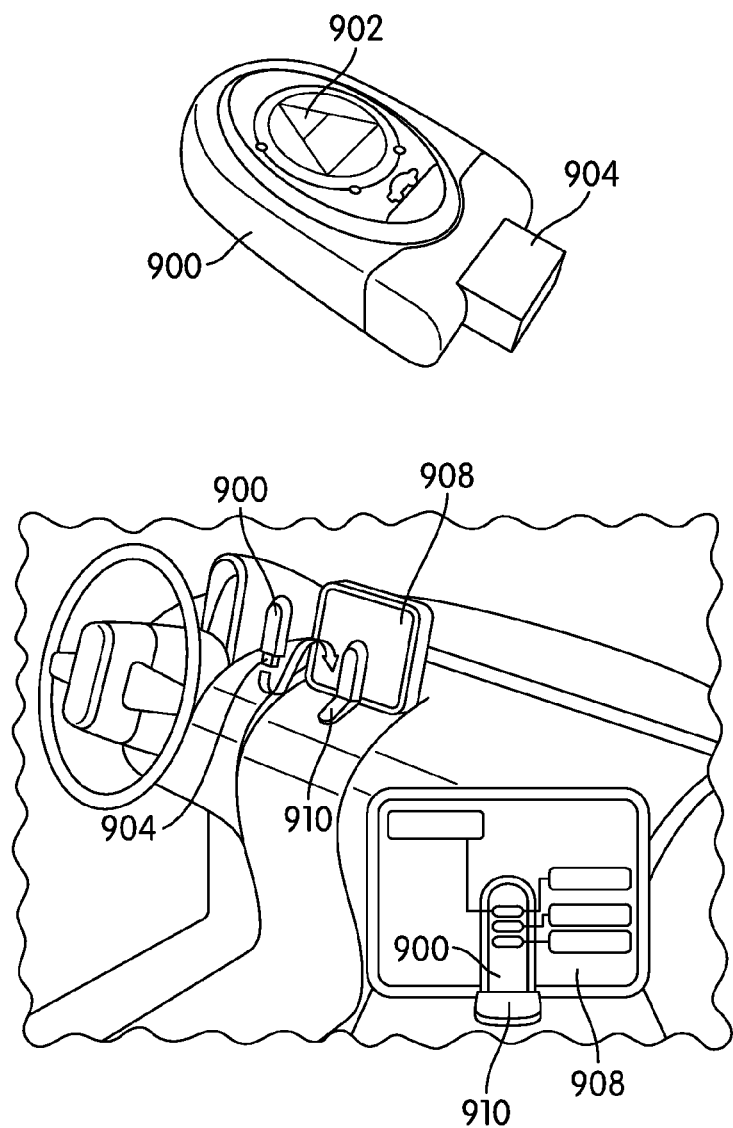
FIG. 9 illustrates a portable electronic device and an exemplary vehicle system for docking a portable electronic device in a vehicle according to an exemplary embodiment.

Referring to FIG. 9, a portable electronic device 900 that may include the functionality of the portable electronic devices described with reference to the previous Figures, as well as additional functions, is shown according to an exemplary embodiment. Portable electronic device 900 is shown to include a reconfigurable display 902 and a physical interface 904. Portable electronic device 900 can include a powerful transceiver and/or antenna configured to facilitate communication with the vehicle at a long range (e.g., greater than 100 m). Portable electronic device 900 may be capable of sending control signals for actuating a vehicle engine, a door lock module, a vehicle air conditioning or HVAC system, vehicle media functions, or any other vehicle system. Reconfigurable display 902 is configured to indicate vehicle statuses via graphics and/or text. The vehicle statuses may include, for example, door lock status, tire pressure alerts (e.g., abnormal pressure from a puncture, under/over pressure, etc.), car battery state of charge and alerts (e.g., in case of a low battery condition), fuel/oil level, engine start status, HVAC status, vehicle diagnostic information, vehicle media information, synchronization information, alarm feedback at an extended range (e.g., in case of a more serious problem, such as a vehicle breakdown, an alarm warning may be sent to the device and user from the vehicle at a range of greater than 600 m), other vehicle status information, or any combination thereof. One or more of the vehicle statuses may be sent to portable electronic device 900 either as a result of a user request for the information or automatically based on predetermined conditions. For example, if a tire pressure, battery state of charge, fuel/oil level, or other diagnostic information is detected as being abnormal, portable electronic device 900 may indicate the abnormality to the user.

According to an exemplary embodiment, portable electronic device 900 may be docked in the vehicle via interface 904 (e.g., USB interface, optical interface, etc.), for example in a dock 910 on a dashboard or instrument panel (e.g., a vehicle display 908) for charging and/or stowing while the user is in the vehicle. Vehicle display 908 may be configured to display detailed information and/or options related to portable electronic device 900 and may also display information selectable using the portable electronic device (e.g., a virtual display). For example, media information related to media files stored on portable electronic device 900 may be displayed. The user may upload the media files to the vehicle (e.g., via a USB interface) or download media files from the vehicle. It is noted that media files may also be sent between portable electronic device 900 and the vehicle over a wireless connection that does not require any docking of device 900 (e.g., a Bluetooth connection). Portable electronic device 900 may include a microphone and/or speaker to facilitate voice recording or recognition and/or to facilitate hands-free use in the vehicle (e.g., hands-free use of a cellular telephone). While portable electronic device 900 is illustrated as having a physical connection to the vehicle during docking, according to other exemplary embodiments portable electronic device 900 may wirelessly communicate with the vehicle while docked or be charged wirelessly via induction.

Figure 10:
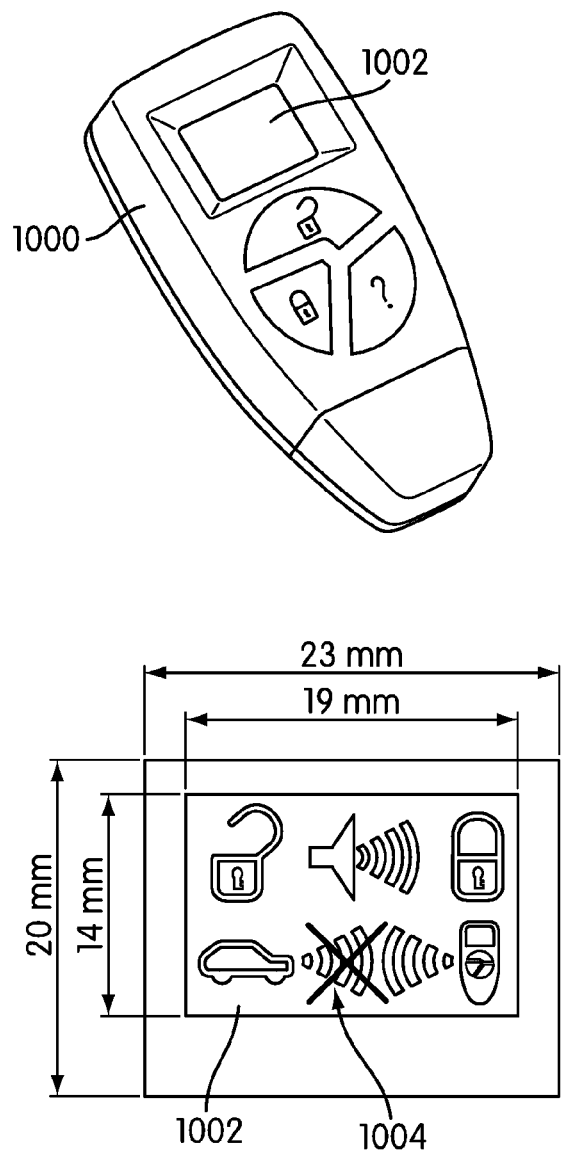
FIG. 10 illustrates a portable electronic device and an exemplary reconfigurable display for a portable electronic device, according to an exemplary embodiment.

Referring to FIG. 10, an exemplary embodiment of a portable electronic device 1000 is shown to include a display 1002 that may facilitate one or more of the functions described with reference to FIG. 9 and/or with reference to any other Figure (e.g., the indication/indicator activities). Display 1002 may be configured to illustrate various statuses, indications, or alerts to a user via display elements such as indicia 1004. According to one exemplary embodiment, indicia 1004 may be a symbol or other recognizable display element configured for easy identification by a user.

Figure 11:
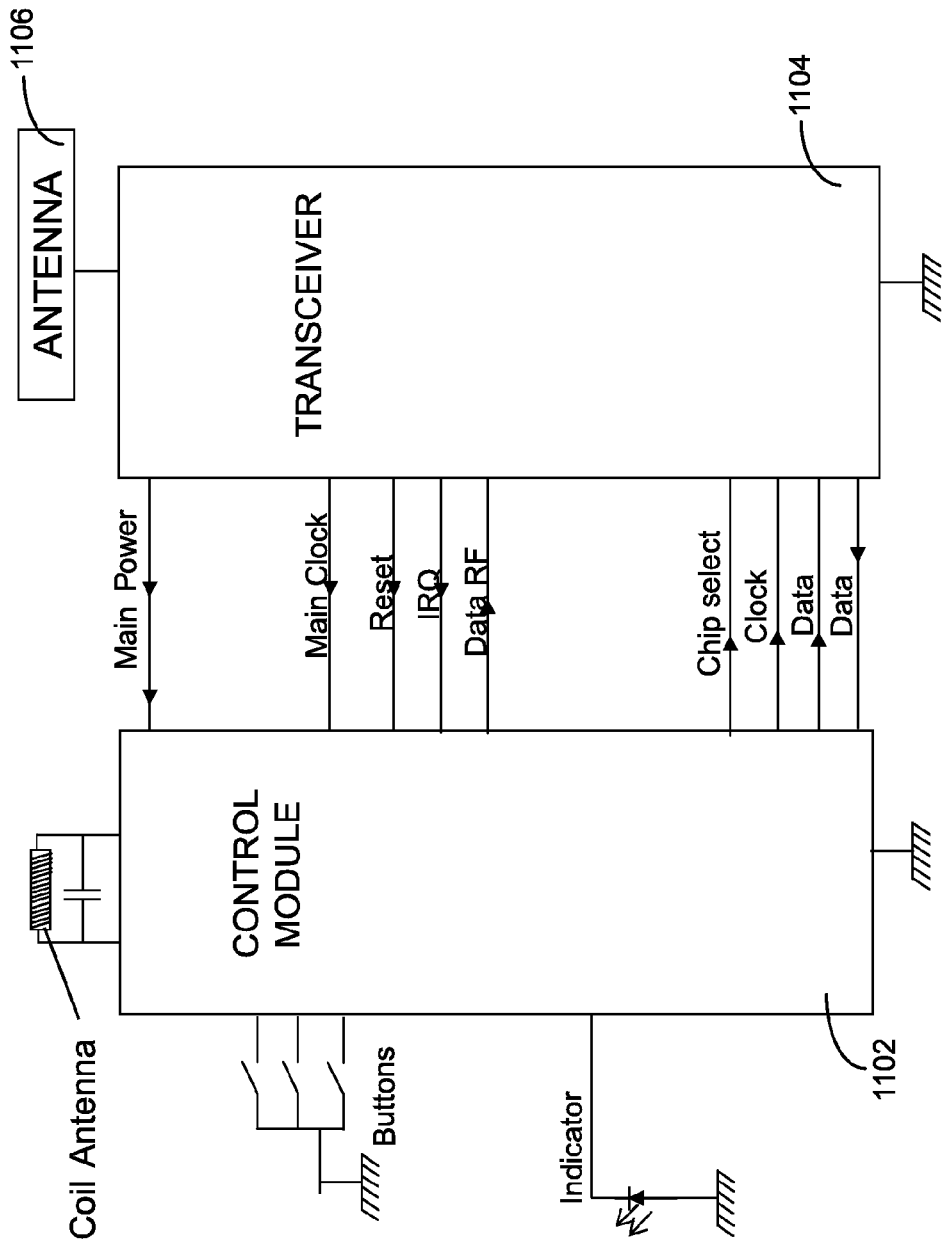
FIG. 11 is a circuit diagram of an exemplary portable electronic device.

Referring now to FIG. 11, a schematic diagram of a circuit for a portable electronic device is shown, according to an exemplary embodiment. The circuit is generally shown to include a controller or control module 1102 (e.g., microcontroller, processor, processing module, control circuit) coupled to a transceiver (e.g., an ATMEL ATA5824 transceiver or another transceiver) 1104. According to various other exemplary embodiments, different configurations for a portable electronic device circuit, controller, and/or transceiver may be provided. Transceiver 1104 is coupled to antenna 1106 for transmitting signals to a vehicle or other outside source.

Figure 12:
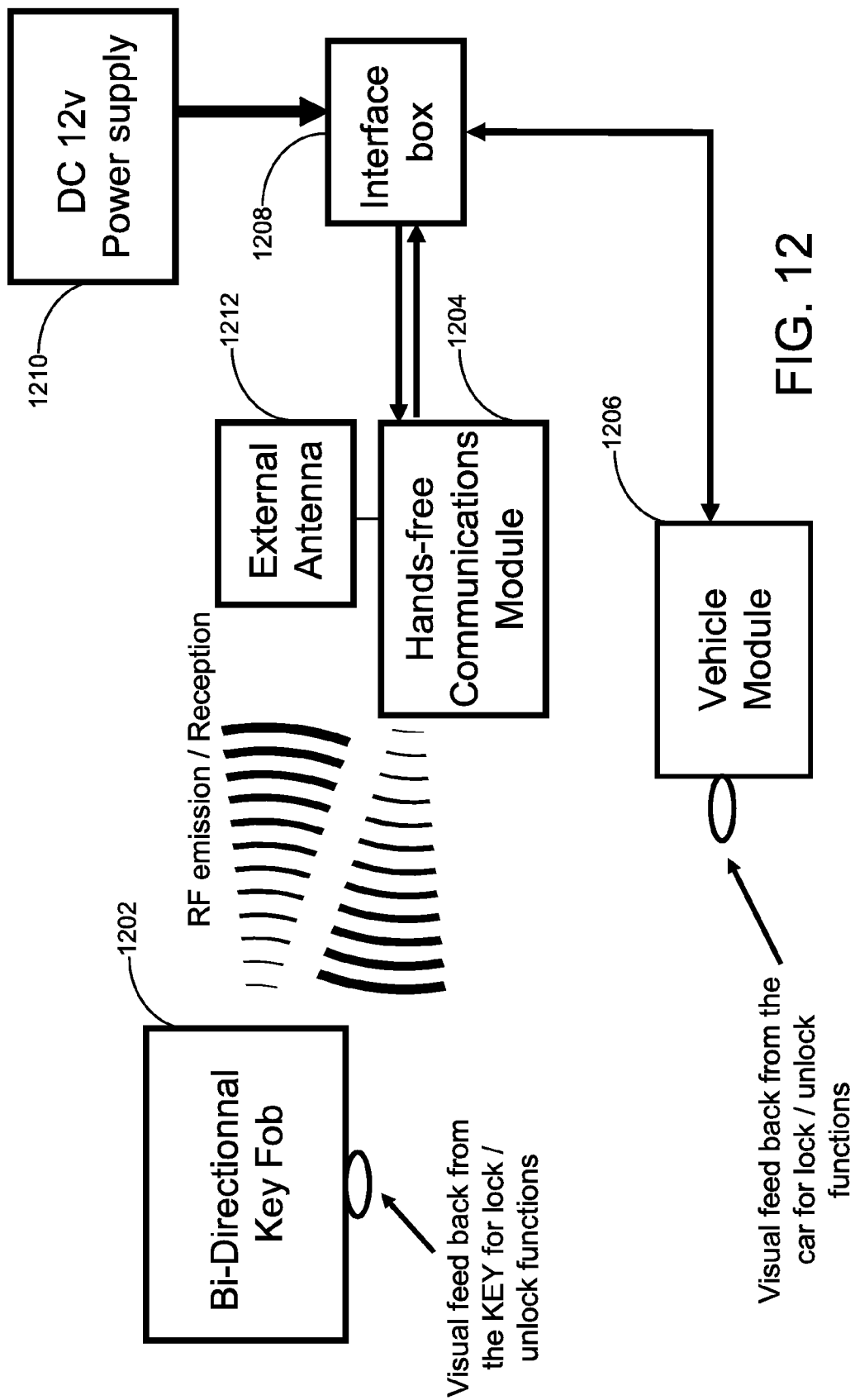
FIG. 12 is a block diagram of a portable electronic device (e.g., bi-directional key fob) communicating with a vehicle control system making use of a hands-free communication module, according to an exemplary embodiment.

Referring now to FIG. 12, a block diagram of a portable electronic device (e.g., bi-directional key fob) for communicating with a vehicle control system is shown, according to an exemplary embodiment. Portable electronic device 1202 is configured to emit and receive radio frequency signals to an external antenna 1212 which may be coupled to a hands-free communications module 1204. In some exemplary embodiments external antenna 1212 may not be provided (e.g., the antenna would be integral with the hands-free communications module and/or located inside the vehicle). Hands-free communication module 1204 may include processing components and/or logic components for activities relating to portable electronic device 1202 and for facilitating phone calls via a vehicle audio system and a phone. Interface box 1208 is shown coupled for bi-directional communication to module 1204. Interface box 1208 may be configured to provide a physical and/or wireless connection between vehicle module 1206 (e.g., body control module, lighting module, door release module, etc.) and module 1204. Module 1204 may receive power via supply 1210 and interface 1208 or otherwise.

It is noted that while specific communications/processing architectures and radio frequencies are shown, according to other exemplary embodiments, any communication or processing system may be used over any wireless frequency or frequencies that are capable of facilitating bi-directional communication between the vehicle and portable electronic device. According to an exemplary embodiment, the portable electronic device may bi-directionally communicate with an existing wireless communications system in the vehicle (e.g., the communication system of FIGS. 3-4) using a wireless protocol such as Bluetooth.

Figure 13:
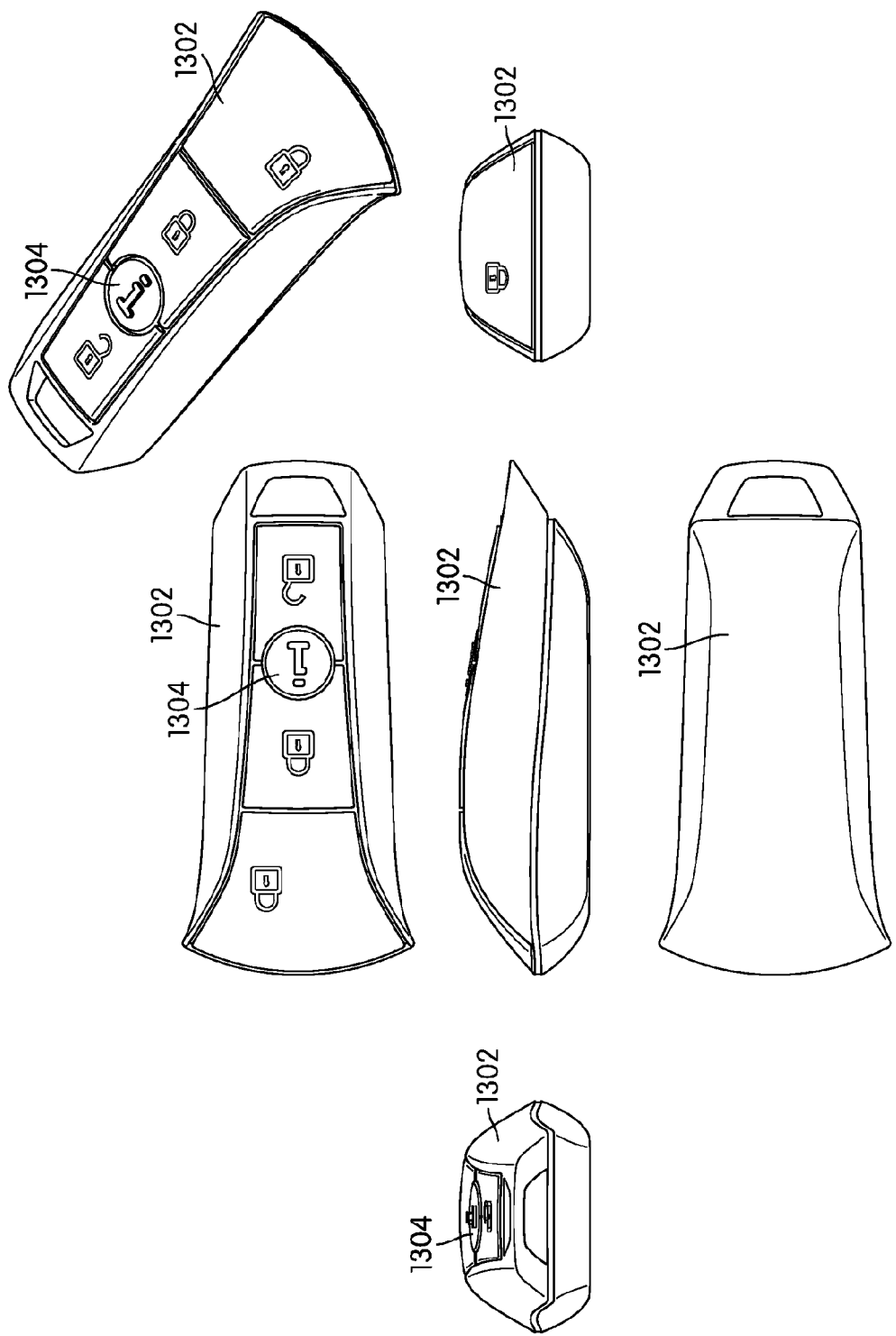
FIGS. 13 and 14 are illustrations of portable electronic devices according to various exemplary embodiments.
Figure 14:
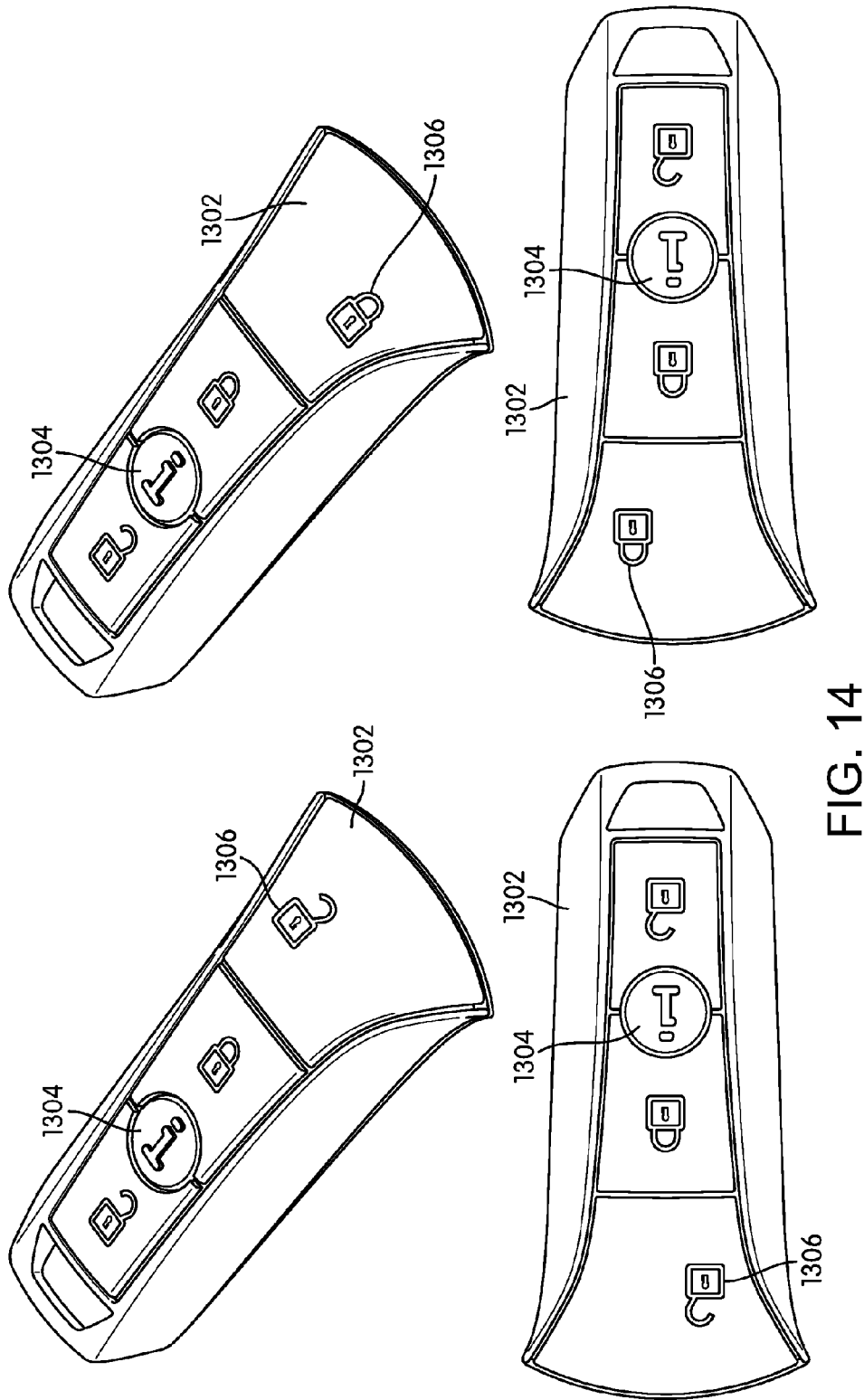

FIGS. 13 and 14 are illustrations of a portable electronic device or portable electronic devices, according to various exemplary embodiments. Portable electronic device 1302 is shown to include a button 1304. Portable electronic device 1302 is further shown to include an indicator 1306. Indicator 1306 may be a display, a backlit area of a housing, a backlit outline, a front lit design, an LED, or some other lit or unlit area of indication on or of the portable electronic device and viewable to an observer. For example, a red graphic illustrating an open padlock may represent an unlocked door state while a green graphic illustrating a closed padlock may represent a locked door state. Indicator 1306 may be any type of display or other indicator. According to various exemplary embodiments, indicator 1306 may be an LCD display, an OLCD display, an LED-based display, one or more LEDs behind a translucent layer, one or more LEDs partially hidden by an opaque layer, and one or more light sources behind a colored film.

Referring further to FIGS. 13 and 14, portable electronic device 1302 is configured for bi-directional communication with the vehicle and indicating vehicle status to a user. Button 1304 may be an information button to request a status from the vehicle. Portable electronic device 1302 may be configured to transmit a command for actuating one or more of the vehicle systems as described in this disclosure and may be capable of indicating statuses related to any of vehicle systems or vehicle functions. According to an exemplary embodiment, when button 1304 is pressed, the portable electronic device does not recall information from a local memory device to conduct the indication activity. Rather, the portable electronic device queries the vehicle system or systems for current status. If current status is not available, this is indicated to the user and/or the previously known state is then recalled from memory and/or otherwise shown.

While the exemplary embodiments illustrated in the figures and described herein are presently preferred, it should be understood that these embodiments are offered by way of example only. Accordingly, the present disclosure is not limited to a particular embodiment, but extends to various modifications that nevertheless fall within the scope of the disclosure.

The present disclosure contemplates methods, systems and program products on any machine-readable media for accomplishing its operations. The embodiments of the present disclosure may be implemented using existing computer processors, or by a special purpose computer processor for an appropriate system, incorporated for this or another purpose or by a hardwired system.

It is important to note that the construction, arrangement, and/or activities of the bi-directional portable electronic device as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the disclosure. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the exemplary embodiments without departing from the scope of the present disclosure.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the disclosure. Likewise, software implementations could be accomplished with standard programming techniques with rule based logic and other logic to accomplish the various connection steps, processing steps, comparison steps and decision steps.

What is claimed is:

1. A portable electronic device for displaying information from a vehicle having a first transceiver to a user carrying the portable electronic device, the portable electronic device comprising:
    a second transceiver configured to send a first signal from the portable electronic device to the first transceiver, the first signal configured to cause the vehicle to conduct an activity in response to the first signal;
    a controller configured to cause the second transceiver to request a status relating to a vehicle parameter from the first transceiver, wherein a second signal is received at the second transceiver and provided to the controller in response to the request; and
    an indicator configured to change display states in response to commands received from the controller;

wherein the controller is configured to cause the indicator to change display states by providing a command to the indicator based on and in response to receiving the second signal;

wherein the controller is configured to provide the command to the indicator without storing information relating to the second signal in memory of the portable electronic device;

wherein the controller is configured to maintain the display state of the indicator that is entered in response to receiving the command until at least one of:

(a) the indicator is cleared by a user request received by the portable electronic device, (b) a new command is sent to the indicator that changes the indicator's display state, and (c) the controller determines that an amount of time has elapsed and causes the indicator to return to a default display state.

2. The portable electronic device of claim 1, wherein the indicator comprises at least one of: an LCD display, an OLED display, an LED-based display, one or more LEDs behind a translucent layer, one or more LEDs partially hidden by a opaque layer, one or more light sources behind a colored film, a field emission display, a plasma display, an LED, a light source integrated with a button, a light source beneath a button, and a light source configured to light a ring around a button.

3. The portable electronic device of claim 1, wherein the portable electronic device is a key fob and is configured to at least one of: attach to a key, to serve as a passive key, to serve as an identification device, to house the key, and to act as the key.

4. The portable electronic device of claim 1, wherein the activity is at least one of: unlocking a vehicle door, locking a vehicle door, opening a vehicle door, closing a vehicle door, starting a vehicle engine, unlocking a trunk, opening a trunk, unlocking a rear hatch, opening a rear hatch, and providing an alarm relating to the vehicle.

5. The portable electronic device of claim 1, wherein the request for the status comprises a request relating to at least one of:

(a) a confirmation of the activity,
(b) an error code,
(c) a vehicle state relating to the activity,
(d) a fuel level,
(e) a battery charge level,
(f) the vehicle parameter,
(g) a locked and/or unlocked state, and
(h) an alarm condition of the vehicle.

6. A method for displaying information received from a vehicle having a first transceiver using an indicator of a portable electronic device, the method comprising:

sending a first signal from the portable electronic device to the first transceiver, wherein the first signal is configured to cause the vehicle to conduct an activity in response to the first signal;

causing the second transceiver to request a status from the first transceiver relating to a vehicle parameter;

receiving a second signal at the portable electronic device in response to the request; and using a controller of the portable electronic device to cause the indicator to change display states based on and in response to the second signal;

using the controller to provide a command to the indicator in response to receiving the second signal at the second transceiver and without storing information relating to the received second signal in a memory device of the portable electronic device.

7. The method of claim 6, wherein the indicator is configured to change display states in response to signals received from the controller, the method further comprising:

maintaining the display state of the indicator that is entered in response to receiving the command until at least one of:

(a) the indicator is cleared by a user request received at the portable electronic device,
(b) a new command is sent to the indicator that changes the indicator's display state, and
(c) a controller determines that a pre-determined amount of time has elapsed and causes the indicator to return to a default display state.

8. The method of claim 6, wherein the activity is at least one of: unlocking a vehicle door, locking the vehicle door, opening the vehicle door, closing the vehicle door, starting a vehicle engine, and providing a vehicle alarm, and wherein the portable electronic device is a key fob configured to attach to a key and/or to serve as a passive key for a vehicle ignition.

* * * * *